United States Patent [19]
Pang et al.

(10) Patent No.: US 10,149,324 B2
(45) Date of Patent: Dec. 4, 2018

(54) RESOURCE INDICATION METHOD, BASE STATION, AND USER EQUIPMENT

(71) Applicant: Huawei Technologies Co., Ltd., Shenzhen (CN)

(72) Inventors: Lingli Pang, Shanghai (CN); Xiaoxiao Zheng, Shanghai (CN); Yueying Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 68 days.

(21) Appl. No.: 15/469,265

(22) Filed: Mar. 24, 2017

(65) Prior Publication Data

US 2017/0202031 A1 Jul. 13, 2017

Related U.S. Application Data

(63) Continuation of application No. PCT/CN2014/087592, filed on Sep. 26, 2014.

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0055* (2013.01); *H04W 72/042* (2013.01); *H04W 72/085* (2013.01)

(58) Field of Classification Search
CPC ........... H04W 74/0833; H04W 72/042; H04W 72/085; H04L 5/0055
See application file for complete search history.

(56) References Cited

U.S. PATENT DOCUMENTS 9,113,442 B2 * 8/2015 Pradas ................. H04W 74/08
2009/0196242 A1 * 8/2009 Sambhwani ........ H04W 74/002
370/329
(Continued)

FOREIGN PATENT DOCUMENTS

CN 101505522 A 8/2009
CN 103139827 A 6/2013
(Continued)

OTHER PUBLICATIONS

"3rd Generation Partnership Project; Technical Specification Group Radio Access Network; Physical channels and mapping of transport channels onto physical channels (FDD) (Release 11)," 3GPP TS 25.211 v11.5.0 (Jun. 2014) pp. 1-63, 3rd Generation Partnership Project, Valbonne, France (Jun. 2014) (Year: 2014).*
(Continued)

*Primary Examiner* — Asad M Nawaz
*Assistant Examiner* — Thomas R Cairns
(74) *Attorney, Agent, or Firm* — Leydig, Voit & Mayer, Ltd.

(57) ABSTRACT

The present invention discloses a resource indication method, a base station, and user equipment. The user equipment includes: a sending unit, configured to send a random access preamble to a base station on a physical random access channel (PRACH), where the PRACH corresponds to at least one acquisition indicator channel (AICH); a detection unit, configured to detect auxiliary indication information and detect, on the at least one AICH, feedback information sent by the base station, where the feedback information includes acquisition indicator (AI) information and extended acquisition indicator (EAI) information; and a determining unit, configured to determine, according to the feedback information and the auxiliary indication information, a resource index of a target resource allocated by the base station in M uplink transmission resources, where M is an integer greater than 32.

16 Claims, 9 Drawing Sheets

(51) Int. Cl.
 H04W 72/04 (2009.01)
 H04W 72/08 (2009.01)

(56) References Cited

U.S. PATENT DOCUMENTS

| | | | | |
|---|---|---|---|---|
| 2013/0084877 A1* | 4/2013 | Martin | ............... | H04W 72/02 |
| | | | | 455/452.1 |
| 2013/0114518 A1* | 5/2013 | Martin | ............... | H04W 72/02 |
| | | | | 370/329 |
| 2013/0142061 A1* | 6/2013 | Kuo | ............ | H04W 52/50 |
| | | | | 370/252 |
| 2014/0286320 A1* | 9/2014 | He | ............ | H04W 74/006 |
| | | | | 370/336 |

FOREIGN PATENT DOCUMENTS

| | | | |
|---|---|---|---|
| CN | 103167579 A | 6/2013 |
| EP | 2600665 A2 | 6/2013 |
| JP | 2011509607 A | 3/2011 |

OTHER PUBLICATIONS

"3rd Generation Partnership Project; Technical Specification Group Radio Access Network; Physical layer procedures (FDD) (Release 11)," 3GPP TS 25.214, V11.9.0, pp. 1-128, 3$^{rd}$ Generation Partnership Project, Valbonne, France (Jun. 2014).

* cited by examiner

RESOURCE INDICATION METHOD, BASE STATION, AND USER EQUIPMENT

CROSS-REFERENCE TO RELATED APPLICATIONS

This application is a continuation of International Application No. PCT/CN2014/087592, filed on Sep. 26, 2014, the disclosure of which is hereby incorporated by reference in its entirety.

TECHNICAL FIELD

The present invention relates to the communications field, and in particular, to a resource indication method, a base station, and user equipment.

BACKGROUND

In the universal mobile telecommunications system (UMTS) of the 3rd generation partnership project (3GPP), user equipment (UE) sends a random access preamble to a base station on a physical random access channel (PRACH), and the base station sends, to the UE on an acquisition indicator channel (AICH), feedback information that is used to indicate an uplink transmission resource of the UE.

The UE performs uplink transmission by using common enhanced dedicated channel (Common E-DCH) resources. The base station may select one set of Common E-DCH resource from a maximum of 32 sets of Common E-DCH resources and indicate, on the AICH, the set of Common E-DCH resource to the UE for usage.

Because a quantity of UEs increases, 32 sets of Common E-DCH resources can hardly meet uplink transmission requirements of the UEs, and the resources need to be extended. However, on the AICH, the base station can indicate a maximum of 32 sets of Common E-DCH resources and cannot indicate extended uplink transmission resources.

SUMMARY

Embodiments of the present invention provide a resource indication method, a base station, and user equipment, so that extended uplink transmission resources can be indicated.

According to a first aspect, user equipment is provided, including: a sending unit, configured to send a random access preamble to a base station on a physical random access channel (PRACH), where the PRACH corresponds to at least one acquisition indicator channel (AICH); a detection unit, configured to detect auxiliary indication information and detect, on the at least one AICH, feedback information sent by the base station, where the feedback information includes acquisition indicator (AI) information and extended acquisition indicator (EAI) information; and a determining unit, configured to determine, according to the feedback information and the auxiliary indication information, a resource index of a target resource allocated by the base station in M uplink transmission resources, where M is an integer greater than 32.

With reference to the first aspect, in a first possible implementation manner of the first aspect, the determining unit is specifically configured to: when the AI information is an acknowledgement (ACK), determine a resource index of a default resource as the resource index of the target resource; or when the AI information is a negative acknowledgement (NACK), determine, according to the auxiliary indication information, a resource index range indicated by the EAI information and determine a resource index corresponding to a value of the EAI information as the resource index of the target resource.

With reference to the first possible implementation manner of the first aspect, in a second possible implementation manner of the first aspect, the user equipment further includes: a receiving unit, configured to receive a random access parameter, where the random access parameter includes: serial numbers of at least two AICHs corresponding to the PRACH; or a serial number of an AICH corresponding to the PRACH and detection indication information, where the detection indication information is used to instruct to detect the auxiliary indication information; or a serial number of an AICH corresponding to the PRACH and at least one time interval, where each time interval in the at least one time interval is a time period between time when the random access preamble is sent and time when the feedback information is detected.

With reference to the second possible implementation manner of the first aspect, in a third possible implementation manner of the first aspect, the PRACH corresponds to an AICH, and the AI information, the EAI information, and the auxiliary indication information are sent on the AICH, where the auxiliary indication information is sent on the last 1024 chips of a timeslot in which the AI information and the EAI information are received.

With reference to the second possible implementation manner of the first aspect, in a fourth possible implementation manner of the first aspect, the PRACH corresponds to an AICH, the AI information and the EAI information are sent on the AICH, and the auxiliary indication information is a serial number of a time interval at which the EAI information is detected.

With reference to the second possible implementation manner of the first aspect, in a fifth possible implementation manner of the first aspect, the AI information and the EAI information are sent on the at least one AICH, and the auxiliary indication information is a serial number of the AICH that carries the EAI information.

With reference to any one of the third to the fifth possible implementation manners of the first aspect, in a sixth possible implementation manner of the first aspect, the determining unit is specifically configured to: when a value of the auxiliary indication information is K, determine that the resource index range indicated by the EAI information is from A to B (including A and B), where A=(X+31×K+1)mod M, B=(X+31×K+31)mod M, K is an integer greater than or equal to 0, and X is a resource index of a default resource corresponding to the random access preamble.

According to a second aspect, a base station is provided, including: a receiving unit, configured to receive, on a physical random access channel (PRACH), a random access preamble sent by user equipment (UE), where the PRACH corresponds to at least one acquisition indicator channel (AICH); a first determining unit, configured to determine a resource index of a target resource allocated to the UE in M uplink transmission resources, where M is an integer greater than 32; a second determining unit, configured to determine feedback information and auxiliary indication information according to the resource index of the target resource, where the feedback information includes acquisition indicator (AI) information and extended acquisition indicator (EAI) information; and a sending unit, configured to send the feedback information on the at least one AICH.

With reference to the second aspect, in a first possible implementation manner of the second aspect, the second determining unit is specifically configured to: when the resource index of the target resource is a resource index of a default resource, determine that the AI information is an acknowledgement (ACK); or when the resource index of the target resource is a resource index of a non-default resource, determine that the AI information is a negative acknowledgement (NACK).

With reference to the first possible implementation manner of the second aspect, in a second possible implementation manner of the second aspect, the base station further includes: a third determining unit, configured to determine a random access parameter obtained by the UE from a network side, where the random access parameter includes: serial numbers of at least two AICHs corresponding to the PRACH; or a serial number of an AICH corresponding to the PRACH and detection indication information, where the detection indication information is used to instruct to detect the auxiliary indication information; or a serial number of an AICH corresponding to the PRACH and at least one time interval, where each time interval in the at least one time interval is a time period between time when the random access preamble is sent and time when the feedback information is detected.

With reference to the second possible implementation manner of the second aspect, in a third possible implementation manner of the second aspect, the PRACH corresponds to an AICH, and the AI information, the EAI information, and the auxiliary indication information are sent on the AICH, where the auxiliary indication information is sent on the last 1024 chips of a timeslot in which the AI information and the EAI information are received.

With reference to the second possible implementation manner of the second aspect, in a fourth possible implementation manner of the second aspect, the PRACH corresponds to an AICH, the AI information and the EAI information are sent on the AICH, and the auxiliary indication information is a serial number of a time interval at which the EAI information is sent.

With reference to the second possible implementation manner of the second aspect, in a fifth possible implementation manner of the second aspect, the AI information and the EAI information are sent on the at least one AICH, and the auxiliary indication information is a serial number of the AICH that carries the EAI information.

With reference to any one of the third to the fifth possible implementation manners of the second aspect, in a sixth possible implementation manner of the second aspect, the second determining unit is specifically configured to: when a resource index range of the target resource is from A to B (including A and B), where A=(X+31×K+1)mod M, and B=(X+31×K+31)mod M, determine that the auxiliary indication information is K, where K is an integer greater than or equal to 0, and X is a resource index of a default resource corresponding to the random access preamble.

According to a third aspect, a resource indication method is provided, including: sending a random access preamble to a base station on a physical random access channel (PRACH), where the PRACH corresponds to at least one acquisition indicator channel (AICH); detecting auxiliary indication information and detecting, on the at least one AICH, feedback information sent by the base station, where the feedback information includes acquisition indicator (AI) information and extended acquisition indicator (EAI) information; and determining, according to the feedback information and the auxiliary indication information, a resource index of a target resource allocated by the base station in M uplink transmission resources, where M is an integer greater than 32.

With reference to the third aspect, in a first possible implementation manner of the third aspect, the determining, according to the feedback information and the auxiliary indication information, a resource index of a target resource allocated by the base station in M uplink transmission resources includes: when the AI information is an acknowledgement (ACK), determining a resource index of a default resource as the resource index of the target resource; or when the AI information is a negative acknowledgement (NACK), determining, according to the auxiliary indication information, a resource index range indicated by the EAI information and determining a resource index corresponding to a value of the EAI information as the resource index of the target resource.

With reference to the first possible implementation manner of the third aspect, in a second possible implementation manner of the third aspect, before the sending a random access preamble on a physical random access channel (PRACH), the method further includes: receiving a random access parameter, where the random access parameter includes: serial numbers of at least two AICHs corresponding to the PRACH; or a serial number of an AICH corresponding to the PRACH and detection indication information, where the detection indication information is used to instruct to detect the auxiliary indication information; or a serial number of an AICH corresponding to the PRACH and at least one time interval, where each time interval in the at least one time interval is a time period between time when the random access preamble is sent and time when the feedback information is detected.

With reference to the second possible implementation manner of the third aspect, in a third possible implementation manner of the third aspect, the PRACH corresponds to an AICH, and the AI information, the EAI information, and the auxiliary indication information are sent on the AICH, where the auxiliary indication information is sent on the last 1024 chips of a timeslot in which the AI information and the EAI information are received.

With reference to the second possible implementation manner of the third aspect, in a fourth possible implementation manner of the third aspect, the PRACH corresponds to an AICH, the AI information and the EAI information are sent on the AICH, and the auxiliary indication information is a serial number of a time interval at which the EAI information is detected.

With reference to the second possible implementation manner of the third aspect, in a fifth possible implementation manner of the third aspect, the AI information and the EAI information are sent on the at least one AICH, and the auxiliary indication information is a serial number of the AICH that carries the EAI information.

With reference to any one of the third to the fifth possible implementation manners of the third aspect, in a sixth possible implementation manner of the third aspect, the determining, according to the auxiliary indication information, a resource index range indicated by the EAI information includes: when a value of the auxiliary indication information is K, determining that the resource index range indicated by the EAI information is from A to B (including A and B), where A=(X+31×K+1)mod M, B=(X+31×K+31) mod M, K is an integer greater than or equal to 0, and X is a resource index of a default resource corresponding to the random access preamble.

According to a fourth aspect, a resource indication method is provided, including: receiving, on a physical random access channel (PRACH), a random access preamble sent by user equipment (UE), where the PRACH corresponds to at least one acquisition indicator channel (AICH); determining a resource index of a target resource allocated to the UE in M uplink transmission resources, where M is an integer greater than 32; determining feedback information and auxiliary indication information according to the resource index of the target resource, where the feedback information includes acquisition indicator (AI) information and extended acquisition indicator (EAI) information; and sending the feedback information on the at least one AICH.

With reference to the fourth aspect, in a first possible implementation manner of the fourth aspect, the determining feedback information according to the resource index of the target resource includes: when the resource index of the target resource is a resource index of a default resource, determining that the AI information is an acknowledgement (ACK); or when the resource index of the target resource is a resource index of a non-default resource, determining that the AI information is a NACK.

With reference to the first possible implementation manner of the fourth aspect, in a second possible implementation manner of the fourth aspect, the method further includes: determining a random access parameter obtained by the UE from a network side, where the random access parameter includes: serial numbers of at least two AICHs corresponding to the PRACH; or a serial number of an AICH corresponding to the PRACH and detection indication information, where the detection indication information is used to instruct to detect the auxiliary indication information; or a serial number of an AICH corresponding to the PRACH and at least one time interval, where each time interval in the at least one time interval is a time period between time when the random access preamble is sent and time when the feedback information is detected.

With reference to the second possible implementation manner of the fourth aspect, in a third possible implementation manner of the fourth aspect, the PRACH corresponds to an AICH, and the AI information, the EAI information, and the auxiliary indication information are sent on the AICH, where the auxiliary indication information is sent on the last 1024 chips of a timeslot in which the AI information and the EAI information are received.

With reference to the second possible implementation manner of the fourth aspect, in a fourth possible implementation manner of the fourth aspect, the PRACH corresponds to an AICH, the AI information and the EAI information are sent on the AICH, and the auxiliary indication information is a serial number of a time interval at which the EAI information is sent.

With reference to the second possible implementation manner of the fourth aspect, in a fifth possible implementation manner of the fourth aspect, the AI information and the EAI information are sent on the at least one AICH, and the auxiliary indication information is a serial number of the AICH that carries the EAI information.

With reference to any one of the third to the fifth possible implementation manners of the fourth aspect, in a sixth possible implementation manner of the fourth aspect, the determining auxiliary indication information according to the resource index of the target resource includes: when a resource index range of the target resource is from A to B (including A and B), where A=(X+31×K+1)mod M, and B=(X+31×K+31)mod M, determining that the auxiliary indication information is K, where K is an integer greater than or equal to 0, and X is a resource index of a default resource corresponding to the random access preamble.

In the embodiments of the present invention, auxiliary indication information is detected and feedback information sent by a base station is detected on an acquisition indicator channel, and both the auxiliary indication information and the feedback information are used to indicate a target resource allocated to user equipment in more than 32 sets of extended uplink transmission resources. Therefore, in the embodiments of the present invention, the extended uplink transmission resources can be indicated.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (LTE TDD) system, a universal mobile telecommunications system (UMTS), or a worldwide interoperability for microwave access (WiMAX) communications system.

It should also be understood that in the embodiments of the present invention, user equipment (UE) may be referred to as a terminal, a mobile station (MS), a mobile terminal, and the like. The user equipment may communicate with one or more core networks through a radio access network (RAN). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

In the embodiments of the present invention, a base station may be a base station (BTS) in the GSM or CDMA, may be a base station (NodeB, or "NB") or an radio network controller (RNC) in the WCDMA, or may further be an evolved NodeB (eNB or e-NodeB) in the LTE. This is not limited in the present invention.

Figure 1:
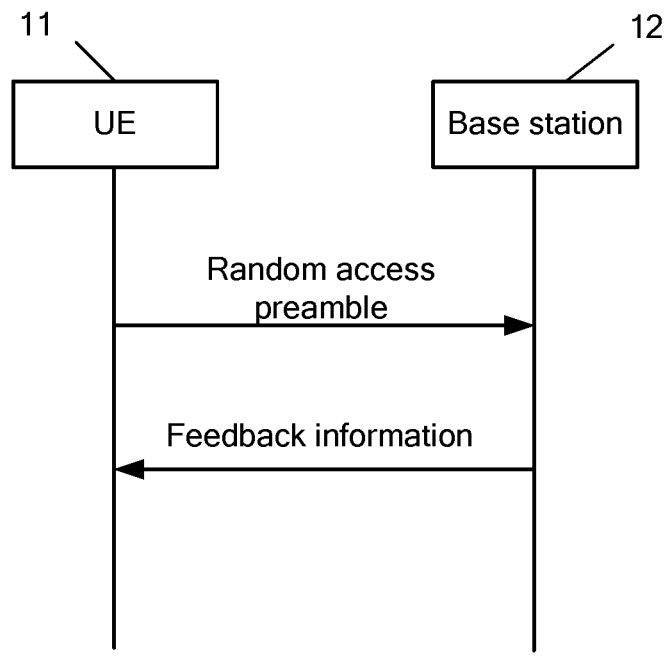
FIG. 1 is a schematic diagram of an applicable scenario according to an embodiment of the present invention.

FIG. 1 is a schematic diagram of an applicable scenario according to an embodiment of the present invention. As shown in FIG. 1, the scenario includes UE 11 and a base station 12, and a process in which the UE 11 performs random access on a PRACH is as follows:

The UE 11 sends a random access preamble to the base station 12 on the physical random access channel (PRACH) according to a random access parameter obtained from a network side. The base station 12 sends feedback information to the UE 11 on an AICH, and the feedback information can indicate a resource that is to be used by the UE 11 to perform uplink transmission. The UE 11 detects the feedback information on the AICH and performs the uplink transmission on the resource indicated by the feedback information. The resource used for the uplink transmission may be a Common E-DCH resource.

When a quantity of UEs increases, a maximum of 32 sets of existing resources can hardly meet data transmission requirements of the UEs, and therefore the maximum of 32 sets of existing resources need to be extended, so as to obtain extended M resources. M is an integer greater than 32. The base station 12 needs to indicate the M resources. The following describes in detail a specific resource indication method, a base station, and user equipment.

Figure 2:
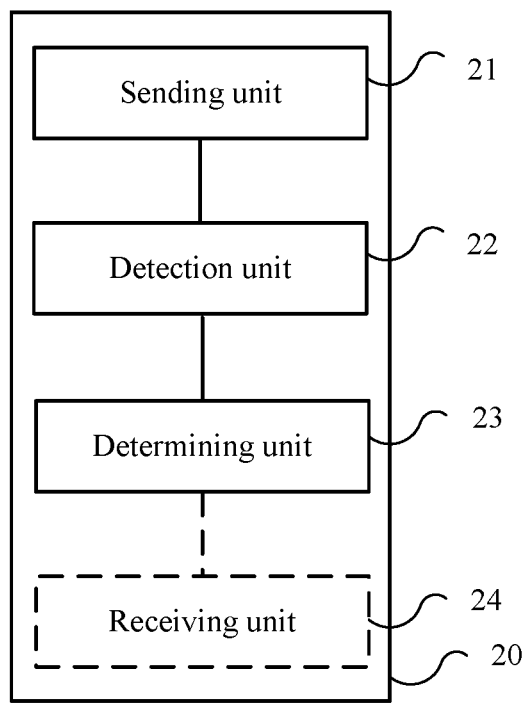
FIG. 2 is a schematic block diagram of user equipment according to an embodiment of the present invention.

FIG. 2 is a schematic block diagram of user equipment according to an embodiment of the present invention. The user equipment 20 may be applied to a random access process shown in FIG. 1. The user equipment 20 may include a sending unit 21, a detection unit 22, and a determining unit 23.

The sending unit 21 is configured to send a random access preamble to a base station on a physical random access channel (PRACH). The PRACH corresponds to at least one acquisition indicator channel (AICH).

The detection unit 22 is configured to detect auxiliary indication information and detect, on the at least one AICH, feedback information sent by the base station. The feedback information includes acquisition indicator (AI) information and extended acquisition indicator (EAI) information.

The determining unit 23 is configured to determine, according to the feedback information and the auxiliary indication information, a resource index of a target resource allocated by the base station in M uplink transmission resources. M is an integer greater than 32.

In this embodiment of the present invention, auxiliary indication information is detected and feedback information sent by a base station is detected on an acquisition indicator channel, and both the auxiliary indication information and the feedback information are used to indicate a target resource allocated to user equipment in more than 32 sets of extended uplink transmission resources. Therefore, in this embodiment of the present invention, the extended uplink transmission resources can be indicated.

It should be understood that the UE may detect, on a same AICH, the AI information and the EAI information that are sent by the base station, or may separately detect the AI information and the EAI information on different AICHs. Both the detected AI information and EAI information may indicate the target resource, that is, a resource used for uplink transmission.

The feedback information sent by the base station on the AICH may include the acquisition indicator (AI) information and the extended acquisition indicator (EAI) information, or may include only the EAI information, or may include only the AI information. That is, the base station may send only the EAI or may send both the AI and the EAI through the AICH. The AI and the EAI may be acknowledgements (ACK), or may be negative acknowledgements (NACK). If both values of the AI and the EAI in the feedback information are the NACKs, a random access process of the UE is rejected, that is, the UE obtains no available resource in this random access process.

Optionally, in an embodiment, the determining unit 23 may determine a resource index of a default resource as the resource index of the target resource when the AI information is the ACK; or when the AI information is the negative acknowledgement (NACK), the determining unit 23 may determine, according to the auxiliary indication information, a resource index range indicated by the EAI information and determine a resource index corresponding to the value of the EAI information as the resource index of the target resource.

It should be understood that the AI information may indicate whether the default resource is available and the EAI information may indicate whether another resource is available. Different values of the EAI information correspond to resource indexes of different resources. For example, when the AI information is the ACK, the determining unit 23 may determine that the UE uses a default resource corresponding to the random access preamble. For example, when the resource index of the default resource is X, in this case, the UE may perform uplink data transmission by using the corresponding default resource whose resource index is X.

Optionally, in another embodiment, the user equipment 20 may further include: a receiving unit 24, configured to receive a random access parameter, where the random access parameter includes serial numbers of at least two AICHs corresponding to the PRACH; or includes a serial number of an AICH corresponding to the PRACH and detection indication information, where the detection indication information is used to instruct to detect the auxiliary indication information; or includes a serial number of an AICH corresponding to the PRACH and at least one time interval, where each time interval in the at least one time interval is a time period between time when the random access preamble is sent and time when the feedback information is detected.

The random access parameter may include information about the PRACH, and a related parameter used for random access such as a serial number of at least one AICH corresponding to the PRACH, or a time interval at which the UE sends a random access preamble. After obtaining the random access parameter, the UE may select a random access signature and an access timeslot according to the random access parameter and send the random access preamble to the base station. After receiving the random access preamble sent by the UE, the base station may send the feedback information to the UE on the AICH. The feedback information indicates that the UE can use no resource or indicates a serial number of a resource that can be used by the UE. The UE may detect, on the AICH, the feedback information sent by the base station.

Optionally, a serial number of the AICH may be a channelization code of the AICH. When the PRACH corresponds to one AICH, the random access parameter may include a serial number of the AICH corresponding to the PRACH; or when the PRACH corresponds to at least two AICHs, the random access parameter may include serial numbers of the at least two AICHs corresponding to the PRACH.

The detection indication information may be used to instruct the UE to detect the auxiliary indication information.

Optionally, in an embodiment, when the PRACH corresponds to an AICH and the random access parameter includes a serial number of the AICH and the detection indication information, the AI information, the EAI information, and the auxiliary indication information are sent on the AICH, and the auxiliary indication information is sent on the last 1024 chips of a timeslot in which the AI information and the EAI information are received.

The base station sends the AI information and the EAI information on the AICH, and further sends the auxiliary indication information on the same AICH. That is, in this case, one PRACH corresponds to only one AICH. Optionally, there is a total of 8 bits of spare information on the last 1024 chips of each timeslot on the AICH. The spare information may be used to carry the auxiliary indication information.

Optionally, a part of the spare information of the last 1024 chips of each timeslot on the current AICH may be used to transmit the auxiliary indication information. Further, when the auxiliary indication information is transmitted on the last 1024 chips of each timeslot on the AICH, a channel that carries the auxiliary indication information and the AICH on which the AI is detected may use different channelization codes, that is, the AI and the auxiliary indication information are sent in a time division manner and a code division manner.

Specifically, in this embodiment, resources may be indicated in a resource indication manner in the following Table 1.

TABLE 1

Resource indication manner

| AI information | EAI information | Auxiliary indication information | Resource index |
|---|---|---|---|
| ACK | NA | NA | X |
| NACK | EAI | K | From (X + 31 × K + 1)mod M to (X + 31 × K + 31)mod M |

NA indicates that the base station does not send the information. X may be a resource index of a default resource corresponding to an access signature selected by the UE. When K is 0 or no information is sent, the resource index range indicated by the EAI information may be from (X+1) mod M to (X+31)mod M; or when K is 1, the resource index range indicated by the EAI information may be from (X+32) mod M to (X+62)mod M.

The determining unit 23 may determine X as the resource index of the target resource when the AI information is the ACK; or determine a resource index corresponding to the value of the EAI information as the resource index of the target resource when the AI information is the negative acknowledgement (NACK). When the AI information is the NACK and the EAI information is the NACK, the UE obtains no resource in this random access process.

Optionally, in another embodiment, when the PRACH corresponds to an AICH and the random access parameter includes a serial number of the AICH and at least one time interval, the AI information and the EAI information are sent on the AICH, and the auxiliary indication information is a serial number of a time interval at which the EAI information is detected. The serial number of the AICH may be a channelization code of the AICH channel.

It should be understood that, after sending the random access preamble to the base station, the UE separately detects feedback information on the AICH at the at least one time interval provided in the random access parameter. For example, the random access parameter may include multiple time intervals such as 7680 chips, 12800 chips, and 20480 chips. It indicates that the UE separately detects feedback information on 7680 chips, 12800 chips, and 20480 chips after sending the random access preamble, until the random access process terminates. The auxiliary indication information is the serial number of the time interval at which the EAI information is detected. The serial number may indicate that the EAI information is detected at an Nth time interval. For example, if the UE detects the EAI on the 7680 chips, the serial number of the corresponding time interval is 0. N is an integer greater than or equal to 0. Preferably, the UE may number time intervals starting from 0 according to an order of the time intervals configured by a network side.

In this embodiment, resources may also be indicated in the resource indication manner in the foregoing Table 1.

When a value of the auxiliary indication information is K, the determining unit 23 may determine that the resource index range indicated by the EAI information is from A to B, where A=(X+31×K+1)mod M, B=(X+31×K+31)mod M, K is an integer greater than or equal to 0, M is a total quantity of uplink transmission resources that can be allocated to the UE, and X is a resource index of a default resource corresponding to the random access preamble.

Specifically, when K equals to 0 (for example, in the above, the EAI information is detected at the time interval of 7680 chips), the resource index range indicated by the EAI information may be from (X+1)mod M to (X+31)mod M; or when K equals to 1 (for example, in the above, the EAI information is detected at the time interval of 12800 chips), the resource index range indicated by the EAI information may be from (X+32)mod M to (X+62)mod M; or when K equals to 2 (for example, in the above, the EAI information is detected at the time interval of 20480 chips), the resource index range indicated by the EAI information may be from (X+63)mod M to (X+93)mod M.

Similarly, the determining unit 23 may determine the resource index X of the default resource as the resource index of the target resource when the AI information is the ACK; or determine a resource index corresponding to the value of the EAI information as the resource index of the target resource when the AI information is the negative acknowledgement (NACK). When the AI information is the NACK and the EAI information is the NACK, the UE obtains no resource in this random access process.

Optionally, in another embodiment, after obtaining the feedback information and the auxiliary indication information, the determining unit 23 may directly obtain, according to a value of the feedback information and/or formulas A=(X+31×K+1)mod M and B=(X+31×K+31)mod M, the resource index of the target resource that can be used by the UE.

Optionally, in another embodiment, when the PRACH corresponds to at least two AICHs, the random access parameter may include serial numbers of the at least two AICHs corresponding to the PRACH. The AI information and the EAI information are sent on the at least two AICHs, and the auxiliary indication information is a serial number of the AICH that carries the EAI information when the EAI is detected. The serial number in the random access parameter is directly sent by the network side. Alternatively, the serial number may be indirectly obtained by the UE by numbering the AICHs starting from 0 according to an order of AICH configuration information sent by the network side; or may be explicitly configured by the network side by using signaling.

Preferably, when one PRACH corresponds to multiple AICHs, if the default resource is unavailable, the feedback information may include only the EAI information, and may not include the AI information. That is, no AI information is sent on any AICH.

It should be understood that the AI information and the EAI information may be sent on the at least one AICH in the following manner: The AI information and the EAI information may be sent on one AICH; or the AI information and the EAI information may be sent on different AICHs.

The AI information and the EAI information are sent on the at least two AICHs in two manners.

For a manner 1, the AI information can be sent on only one AICH in the at least two AICHs, and only the EAI information can be sent on a remaining AICH.

If the serial number of the AICH that carries the EAI information is K and K is an integer greater than or equal to 0, in this embodiment, resources may also be indicated in the resource indication manner in the foregoing Table 1.

When a value of the auxiliary indication information is K, the determining unit 23 may determine that the resource index range indicated by the EAI information is from A to B, where A=(X+31×K+1)mod M, B=(X+31×K+31)mod M, K is an integer greater than or equal to 0, M is a total quantity of uplink transmission resources that can be allocated to the UE, and X is a resource index of a default resource corresponding to the random access preamble.

Specifically, when the serial number K of the AICH that carries the EAI information equals to 0, the resource index range indicated by the EAI information may be from (X+1) mod M to (X+31)mod M; or when the serial number K of the AICH that carries the EAI information equals to 1, the resource index range indicated by the EAI information may be from (X+32)mod M to (X+62)mod M; or when the serial number K of the AICH that carries the EAI information equals to 2, the resource index range indicated by the EAI information may be from (X+63)mod M to (X+93)mod M.

Similarly, the determining unit 23 may determine the resource index X of the default resource as the resource index of the target resource when the AI information is the ACK; or determine a resource index corresponding to the value of the EAI information as the resource index of the target resource when the AI information is the negative acknowledgement (NACK). When the AI information is the NACK and the EAI information is the NACK, the UE obtains no resource in this random access process.

For a manner 2, the AI information and the EAI information can be sent on each AICH in the at least two AICHs, but are sent on only one AICH at one time interval.

Specifically, if it is assumed that resource indexes of default resources respectively corresponding to the at least two AICHs are X, Y, Z, and the like, in this case, resource index ranges indicated by the EAI information sent on the AICHs may be respectively: from (X+1)mod M to (X+31) mod M, from (Y+1)mod M to (Y+31)mod M, from (Z+1) mod M to (Z+31)mod M, and the like.

Similarly, the determining unit 23 of the UE may determine X as the resource index of the target resource when the AI information is the ACK; or when the AI information is the NACK, determine the resource index range indicated by the EAI information and determine a resource index corresponding to the value of the EAI information as the resource index of the target resource.

For example, if the PRACH corresponds to two AICHs, in this embodiment, resources may be indicated in a resource indication manner in the following Table 2.

TABLE 2

| Resource indication manner | | | | |
|---|---|---|---|---|
| AI 1 information | AI 2 information | EAI 1 information | EAI 2 information | Resource index |
| ACK | NA | NA | NA | X |
| NACK | NA | EAI | NA | From (X + 1)mod M to (X + 31)mod M |
| NA | ACK | NA | NA | Y |
| NA | NACK | NA | EAI | From (Y + 1)mod M to (Y + 31)mod M |
| NACK | NA | NACK | NA | No available resource |

The AI 1 and the EAI 1 are sent on a first AICH channel, the AI 2 and the EAI 2 are sent on a second AICH channel, and X is a resource index of a default resource on an AICH. Y is a resource index of a default resource on another AICH.

It should be understood that resources may also be indicated in the resource indication manner in Table 2 when a quantity of AICHs is 3, 4, or the like. For example, if a resource index of a default resource on a third AICH is Z, a resource index range indicated by EAI information on the third AICH is from (Z+1)mod M to (Z+31)mod M, and the rest can be deduced from this.

In this embodiment of the present invention, auxiliary indication information is detected and feedback information sent by a base station is detected on an acquisition indicator channel, and both the auxiliary indication information and the feedback information are used to indicate a target resource allocated to user equipment in more than 32 sets of extended uplink transmission resources. Therefore, in this embodiment of the present invention, the extended uplink transmission resources can be indicated.

Figure 3:
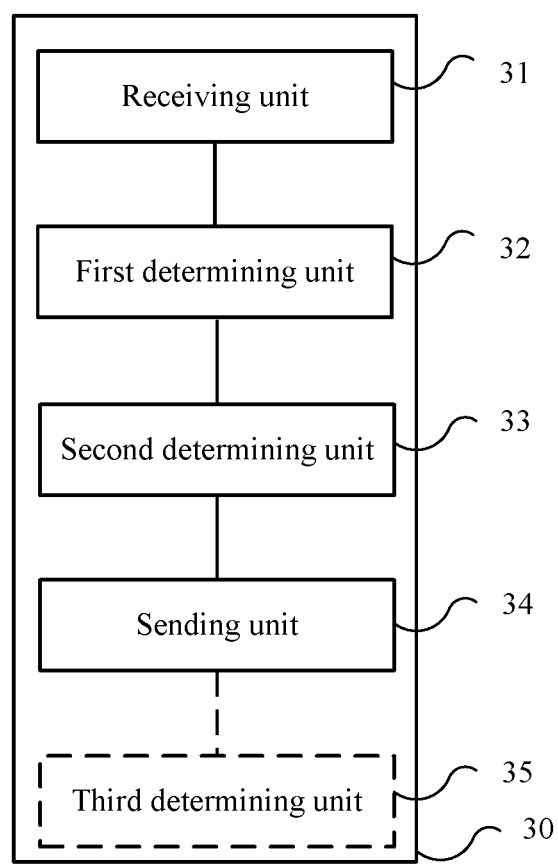
FIG. 3 is a schematic block diagram of a base station according to an embodiment of the present invention.

FIG. 3 is a schematic block diagram of a base station according to an embodiment of the present invention. The base station 30 may be applied to the random access process shown in FIG. 1. The base station 30 may include a receiving unit 31, a first determining unit 32, a second determining unit 33, and a sending unit 34.

The receiving unit 31 is configured to receive, on a physical random access channel (PRACH), a random access preamble sent by user equipment (UE). The PRACH corresponds to at least one acquisition indicator channel (AICH).

The first determining unit 32 is configured to determine a resource index of a target resource allocated to the UE in M uplink transmission resources. M is an integer greater than 32.

The second determining unit 33 is configured to determine feedback information and auxiliary indication information according to the resource index of the target resource. The feedback information includes acquisition indicator (AI) information and extended acquisition indicator (EAI) information.

The sending unit 34 is configured to send the feedback information on the at least one AICH.

In this embodiment of the present invention, auxiliary indication information is determined and feedback information sent by a base station is detected on an acquisition indicator channel, and both the auxiliary indication information and the feedback information are used to indicate a target resource allocated to user equipment in more than 32 sets of extended uplink transmission resources. Therefore, in this embodiment of the present invention, the extended uplink transmission resources can be indicated.

It should be understood that the UE may detect, on a same AICH, the AI information and the EAI information that are sent by the base station, or may separately detect the AI information and the EAI information on different AICHs. Both the detected AI information and EAI information may indicate the target resource, that is, a resource used for uplink transmission.

The feedback information sent by the base station on the AICH may include the acquisition indicator (AI) information and the extended acquisition indicator (EAIt) information, or may include only the EAI information, or may include only the AI information. That is, the base station may send only the EAI or may send both the AI and the EAI through the AICH. The AI and the EAI may be acknowledgements (ACK), or may be negative acknowledgements (NACK). If both values of the AI and the EAI in the feedback information are the NACKs, a random access process of the UE is rejected, that is, the UE obtains no available resource in this random access process.

Optionally, in an embodiment, when the resource index of the target resource is a resource index X of a default resource, the second determining unit 33 may determine that the AI information is an acknowledgement (ACK); or when the resource index of the target resource is a resource index of a non-default resource, that is, when the resource index of the target resource is not X, according to the resource index of the target resource, the second determining unit 33 may determine the auxiliary indication information and the EAI information and determine that the AI information is a negative acknowledgement (NACK).

It should be understood that the AI information may indicate whether the default resource is available and the EAI information may indicate whether another resource is available. Different values of the EAI information correspond to resource indexes of different resources. For example, when the UE uses a default resource corresponding to the random access preamble, the second determining unit 33 may determine that the AI information is the ACK. For example, when the resource index of the default resource is X and the UE performs uplink data transmission by using the corresponding default resource whose resource index is X, the second determining unit 33 may determine that the AI information is the ACK.

Optionally, in another embodiment, the base station 30 may further include: a third determining unit 35, configured to determine a random access parameter obtained by the UE from a network side, where the random access parameter includes serial numbers of at least two AICHs corresponding to the PRACH; or includes a serial number of an AICH corresponding to the PRACH and detection indication information, where the detection indication information is used to instruct to detect the auxiliary indication information; or includes a serial number of an AICH corresponding to the PRACH and at least one time interval, where each time interval in the at least one time interval is a time period between time when the random access preamble is sent and time when the feedback information is detected.

The third determining unit 35 may perform the foregoing step before the receiving unit 31 receives the random access preamble. Preferably, the random access preamble is sent by a radio network controller (RNC) to a NodeB.

The random access parameter may include information about the PRACH, and a related parameter used for random access such as a serial number of at least one AICH corresponding to the PRACH, or a time interval at which the UE sends a random access preamble. After obtaining the random access parameter, the base station may detect, according to the random access parameter, the random access preamble sent by the UE. After receiving the random access preamble sent by the UE, the base station may send the feedback information to the UE on the AICH. The feedback information indicates that the UE can use no resource or indicates a serial number of a resource that can be used by the UE. The UE may detect, on the AICH, the feedback information sent by the base station.

Optionally, a serial number of the AICH may be a channelization code of the AICH. When the PRACH corresponds to one AICH, the random access parameter may include a serial number of the AICH corresponding to the PRACH; or when the PRACH corresponds to at least two AICHs, the random access parameter may include serial numbers of the at least two AICHs corresponding to the PRACH.

The detection indication information may be used to indicate that the base station may send the auxiliary indication information.

Optionally, in an embodiment, when the PRACH corresponds to an AICH and the random access parameter includes a serial number of the AICH and the detection indication information, the AI information, the EAI information, and the auxiliary indication information are sent on the AICH, and the auxiliary indication information is sent on the last 1024 chips of a timeslot in which the AI information and the EAI information are received.

The base station sends the AI information and the EAI information on the AICH, and further sends the auxiliary indication information on the same AICH. That is, in this case, one PRACH corresponds to only one AICH. Optionally, there is a total of 8 bits of spare information on the last 1024 chips of each timeslot on the AICH. The spare information may be used to carry the auxiliary indication information.

Optionally, a part of the spare information of the last 1024 chips of each timeslot on the current AICH may be used to transmit the auxiliary indication information. Further, when the auxiliary indication information is transmitted on the last 1024 chips of each timeslot on the AICH, a channel that carries the auxiliary indication information and the AICH channel on which the AI is sent may use different channelization codes, that is, the AI and the auxiliary indication information are sent in a time division manner and a code division manner.

Specifically, in this embodiment, resources may be indicated in the resource indication manner in the foregoing Table 1. To avoid repetition, details are not described herein again.

When a resource index range of the target resource is from A to B, where A=(X+31×K+1)mod M, and B=(X+31×K+31)mod M, the second determining unit 33 may determine that the auxiliary indication information is K, where K is an integer greater than or equal to 0, and X is a resource index of a default resource corresponding to the random access preamble.

Specifically, X may be a resource index of a default resource corresponding to an access signature selected by the UE. When a resource index range indicated by the EAI information is from (X+1)mod M to (X+31)mod M and X is the resource index of the target resource, it may be determined that K is 0 or none is sent and that the AI information is the ACK; or when the resource index range indicated by the EAI information may be from (X+32)mod M to (X+62)mod M, it is determined that K is 1.

Using X equaling to 0 as an example, when the target resource is index 34, the base station determines that the default resource is unavailable and that the AI is the NACK, and determines that the auxiliary indication information K is 1 and that the resource index indicated by the EAI information is 34. The resource index value 34 indicated by the EAI is obtained by calculation, instead of being directly sent to the UE by using the EAI.

The second determining unit 33 may determine that the AI information is the acknowledgement (ACK), when the resource index of the target resource is the resource index of the default resource; or determine that the AI information is the negative acknowledgement (NACK), when the resource index of the target resource is a resource index of a non-default resource. When the UE obtains no available resource, the AI information and the EAI information are NACKs.

Optionally, in another embodiment, when the PRACH corresponds to an AICH and the random access parameter includes a serial number of the AICH and at least one time interval, the AI information and the EAI information are sent on the AICH, and the auxiliary indication information is a serial number of a time interval at which the EAI information is sent. The serial number of the AICH may be a channelization code of the AICH channel.

It should be understood that, after sending the random access preamble to the base station, the UE separately detects feedback information on the AICH at the at least one time interval provided in the random access parameter. For example, the random access parameter may include multiple time intervals such as 7680 chips, 12800 chips, and 20480 chips. It indicates that the UE separately detects feedback information on 7680 chips, 12800 chips, and 20480 chips after sending the random access preamble, until the random access process terminates. Correspondingly, after detecting the access preamble sent by the UE, the base station may send feedback information at any one of the foregoing time intervals. According to the resource index of the target resource, the base station determines to send the feedback information at a Kth time interval and determines a value of the feedback information. Using X equaling to 0 as an example, if the target resource index is 3, the base station sends the EAI at an interval of 7680 chips after detecting the preamble, and in this case, the auxiliary indication information K is 0. Preferably, the base station may number time intervals starting from 0 according to an order of the time intervals configured by a network side.

In this embodiment, resources may also be indicated in the resource indication manner in the foregoing Table 1.

When a resource index range of the target resource is from A to B, where A=(X+31×K+1)mod M, and B=(X+31×K+31)mod M, the second determining unit 33 may determine that the auxiliary indication information is K, where K is an integer greater than or equal to 0, and X is a resource index of a default resource corresponding to the random access preamble.

Specifically, when the resource index range of the target resource is from (X+1)mod M to (X+31)mod M, the second determining unit 33 may determine that K equals to 0 (for example, in the above, the EAI information is detected at the time interval of 7680 chips); or when the resource index range of the target resource is from (X+32)mod M to (X+62)mod M, the second determining unit 33 may determine that K equals to 1 (for example, in the above, the EAI information is detected at the time interval of 12800 chips); or when the resource index range of the target resource is from (X+63)mod M to (X+93)mod M, the second determining unit 33 may determine that K equals to 2 (for example, in the above, the EAI information is detected at the time interval of 20480 chips).

Specifically, using a default resource index being 1 as an example, when a value of the target resource index is 3, the base station may send feedback information at an interval of 7680 chips after detecting the access preamble; or when a value of the target resource index is 43, the base station may send feedback information at an interval of 12800 chips after detecting the access preamble; or when a value of the target resource index is 83, the base station may send feedback information at an interval of 20480 chips after detecting the access preamble.

Similarly, the second determining unit 33 may determine that the AI information is the acknowledgement (ACK), when the resource index of the target resource is the resource index of the default resource; or determine that the AI information is the negative acknowledgement (NACK), when the resource index of the target resource is a resource index of a non-default resource. When the UE obtains no available resource, the AI information and the EAI information are NACKs.

Optionally, in another embodiment, when the PRACH corresponds to at least two AICHs, the random access parameter may include serial numbers of the at least two AICHs corresponding to the PRACH. The AI information and the EAI information are sent on the at least two AICHs, and the auxiliary indication information is a serial number of the AICH that carries the EAI information when the EAI is detected. The serial number in the random access parameter is directly sent by the network side. Alternatively, the serial number may be indirectly obtained by the UE by numbering the AICHs starting from 0 according to an order of AICH configuration information sent by the network side; or may be explicitly configured by the network side by using signaling.

Preferably, when one PRACH corresponds to multiple AICHs, if the default resource is unavailable, the feedback information may include only the EAI information, and may not include the AI information. That is, no AI information is sent on any AICH.

It should be understood that the AI information and the EAI information may be sent on the at least one AICH in the following manner: The AI information and the EAI information may be sent on one AICH; or the AI information and the EAI information may be sent on different AICHs.

The AI information and the EAI information are sent on the at least two AICHs in two manners.

For a manner 1, the AI information can be sent on only one AICH in the at least two AICHs, and only the EAI information can be sent on a remaining AICH.

According to the target resource index, it is determined that the serial number of the AICH that carries the EAI information is K, where K is an integer greater than or equal to 0. Therefore, in this embodiment, resources may also be indicated in the resource indication manner in the foregoing Table 1.

When a resource index range of the target resource is from A to B, where A=(X+31×K+1)mod M, and B=(X+31×K+31)mod M, the second determining unit 33 may determine that the auxiliary indication information is K, where K is an integer greater than or equal to 0, and X is a resource index of a default resource corresponding to the random access preamble.

Specifically, when the resource index range of the target resource is from (X+1)mod M to (X+31)mod M, the second determining unit 33 may determine that the serial number K of the AICH that carries the EAI information equals to 0; or when the resource index range of the target resource is from (X+32)mod M to (X+62)mod M, the second determining unit 33 may determine that the serial number K of the AICH that carries the EAI information equals to 1; or when the resource index range of the target resource is from (X+63)mod M to (X+93)mod M, the second determining unit 33 may determine that the serial number K of the AICH that carries the EAI information equals to 2.

Similarly, the second determining unit 33 may determine that the AI information is the acknowledgement (ACK), when the resource index of the target resource is the resource index of the default resource; or determine that the AI information is the negative acknowledgement (NACK), when the resource index of the target resource is a resource index of a non-default resource. When the UE obtains no available resource, the AI information and the EAI information are NACKs.

For a manner 2, the AI information and the EAI information can be sent on each AICH in the at least two AICHs, but are sent on only one AICH at one time interval.

Specifically, if it is assumed that resource indexes of default resources respectively corresponding to the at least two AICHs are X, Y, Z, and the like, in this case, resource index ranges indicated by the EAI information sent on the AICHs may be respectively: from (X+1)mod M to (X+31)mod M, from (Y+1)mod M to (Y+31)mod M, from (Z+1)mod M to (Z+31)mod M, and the like.

Similarly, the second determining unit 33 may determine that the AI information is the acknowledgement (ACK), when the resource index of the target resource is the resource index of the default resource; or determine that the AI information is the negative acknowledgement (NACK), when the resource index of the target resource is a resource index of a non-default resource. When the UE obtains no available resource, the AI information and the EAI information are NACKs.

For example, if the PRACH corresponds to two AICHs, in this embodiment, resources may be indicated in the resource indication manner in the foregoing Table 2. To avoid repetition, details are not described herein again.

X is a resource index of a default resource on an AICH. Y is a resource index of a default resource on another AICH.

It should be understood that resources may also be indicated in the resource indication manner in Table 2 when a quantity of AICHs is 3, 4, or the like. For example, if a resource index of a default resource on a third AICH is Z, a resource index range indicated by EAI information on the third AICH is from (Z+1)mod M to (Z+31)mod M, and the rest can be deduced from this.

In this embodiment of the present invention, auxiliary indication information is detected and feedback information sent by a base station is detected on an acquisition indicator channel, and both the auxiliary indication information and the feedback information are used to indicate a target resource allocated to user equipment in more than 32 sets of extended uplink transmission resources. Therefore, in this embodiment of the present invention, the extended uplink transmission resources can be indicated.

Figure 4:
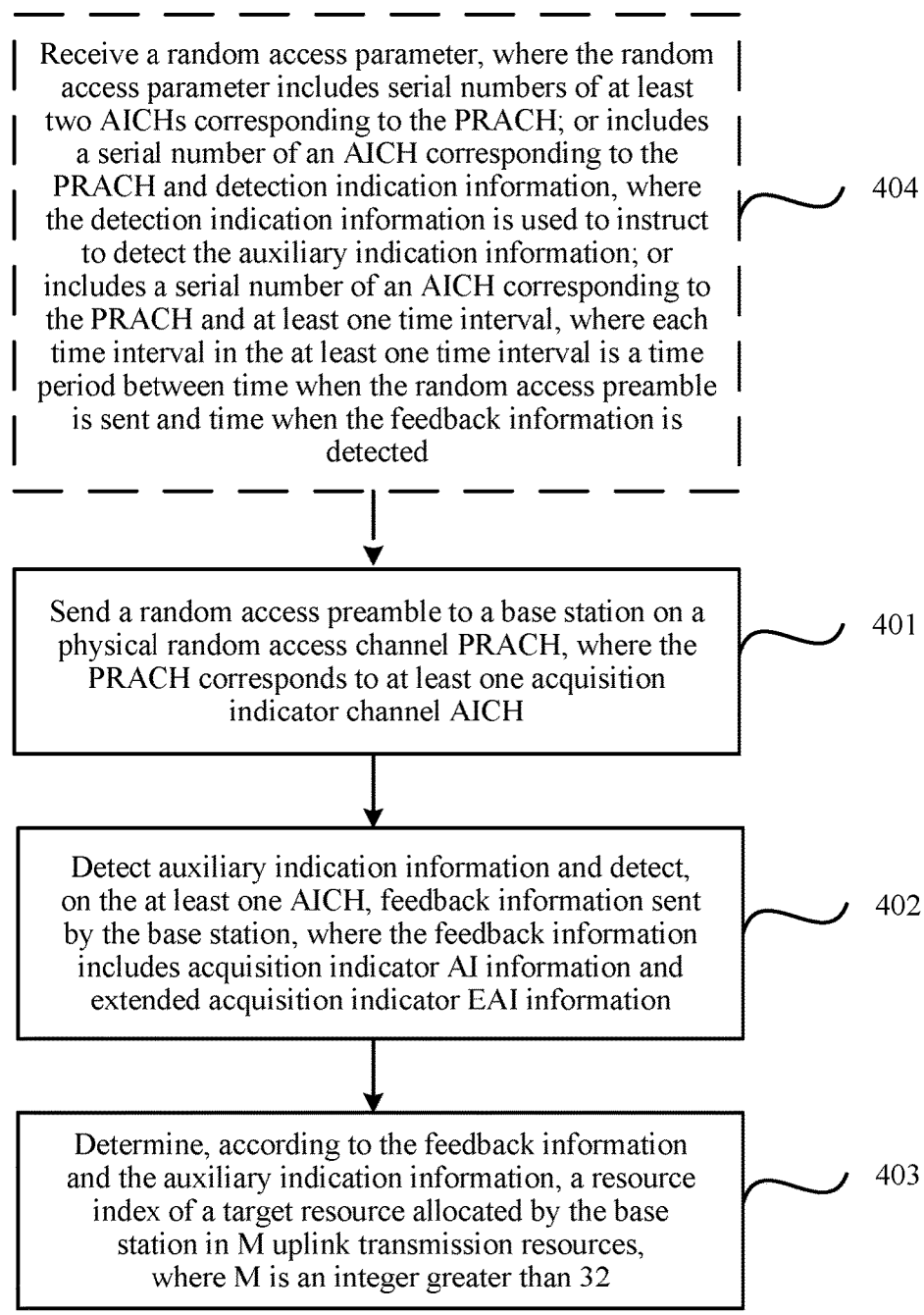
FIG. 4 is a schematic flowchart of a resource indication method according to an embodiment of the present invention.

FIG. 4 is a schematic flowchart of a resource indication method according to an embodiment of the present invention. The method 400 may be executed by user equipment, and the user equipment 20 involved in FIG. 2 may be applicable to the method 400. The method 400 includes:

401. Send a random access preamble to a base station on a physical random access channel (PRACH), where the PRACH corresponds to at least one acquisition indicator channel (AICH).

402. Detect auxiliary indication information and detect, on the at least one AICH, feedback information sent by the base station, where the feedback information includes acquisition indicator (AI) information and extended acquisition indicator (EAI) information.

403. Determine, according to the feedback information and the auxiliary indication information, a resource index of a target resource allocated by the base station in M uplink transmission resources, where M is an integer greater than 32.

In this embodiment of the present invention, auxiliary indication information is detected and feedback information sent by a base station is detected on an acquisition indicator channel, and both the auxiliary indication information and the feedback information are used to indicate a target resource allocated to user equipment in more than 32 sets of extended uplink transmission resources. Therefore, in this embodiment of the present invention, the extended uplink transmission resources can be indicated.

It should be understood that the UE may detect, on a same AICH, the AI information and the EAI information that are sent by the base station, or may separately detect the AI information and the EAI information on different AICHs. Both the detected AI information and EAI information may indicate the target resource, that is, a resource used for uplink transmission. In step 402, the EAI information may not be sent. For example, when a default resource corresponding to the access preamble is the target resource index, the EAI information is not sent on the AICH. The explanation is applicable to all the embodiments of the present invention.

The feedback information sent by the base station on the AICH may include the acquisition indicator (AI) information and the extended acquisition indicator (EAI) information, or may include only the EAI information, or may include only the AI information. That is, the base station may send only the EAI, or may send only the AI, or may send both the AI and the EAI through the AICH. The AI and the EAI may be acknowledgements (ACK), or may be negative acknowledgements (NACK). If both values of the AI and the EAI in the feedback information are the NACKs, this random access process of the UE is rejected, that is, the UE obtains no available resource in this random access process.

Optionally, in an embodiment, in step 403, the UE may determine a resource index X of a default resource as the resource index of the target resource when the AI information is the acknowledgement (ACK); or when the AI information is the negative acknowledgement (NACK), the UE may determine, according to the auxiliary indication information, a resource index range indicated by the EAI information and determine a resource index corresponding to the value of the EAI information as the resource index of the target resource.

It should be understood that the AI information may indicate whether the default resource is available and the EAI information may indicate whether another resource is available. Different values of the EAI information correspond to resource indexes of different resources. For example, when the AI information is the ACK, the UE may use the default resource corresponding to the random access preamble. For example, when the resource index of the default resource is X, in this case, the UE may perform uplink data transmission by using the resource whose resource index is X.

Optionally, in another embodiment, the method 400 further includes:

404. Receive a random access parameter, where the random access parameter includes serial numbers of at least two AICHs corresponding to the PRACH; or includes a serial number of an AICH corresponding to the PRACH and detection indication information, where the detection indication information is used to instruct to detect the auxiliary indication information; or includes a serial number of an AICH corresponding to the PRACH and at least one time interval, where each time interval in the at least one time interval is a time period between time when the random access preamble is sent and time when the feedback information is detected.

The random access parameter may include information about the PRACH, and a related parameter used for random access such as a serial number of at least one AICH corresponding to the PRACH, or a time interval at which the UE sends a random access preamble. After obtaining the random access parameter, the UE may select a random access signature and an access timeslot according to the random access parameter and send the random access preamble to the base station. After receiving the random access preamble sent by the UE, the base station may send the feedback information to the UE on the AICH. The feedback information indicates that the UE can use no resource or indicates a serial number of a resource that can be used by the UE. The UE may detect, on the AICH, the feedback information sent by the base station.

Optionally, a serial number of the AICH may be a channelization code of the AICH. When the PRACH corresponds to one AICH, the random access parameter may include a serial number of the AICH corresponding to the PRACH; or when the PRACH corresponds to at least two AICHs, the random access parameter may include serial numbers of the at least two AICHs corresponding to the PRACH.

The detection indication information may be used to instruct the UE to detect the auxiliary indication information.

Optionally, in an embodiment, when the PRACH corresponds to an AICH and the random access parameter includes a serial number of the AICH and the detection indication information, the AI information, the EAI information, and the auxiliary indication information are sent on the AICH, and the auxiliary indication information is sent on the last 1024 chips of a timeslot in which the AI information and the EAI information are received.

The base station sends the AI information and the EAI information on the AICH, and further sends the auxiliary indication information on the same AICH. That is, in this case, one PRACH corresponds to only one AICH. Optionally, there is a total of 8 bits of spare information on the last 1024 chips of each timeslot on the AICH. The spare information may be used to carry the auxiliary indication information.

Optionally, a part of the spare information of the last 1024 chips of each timeslot on the current AICH may be used to transmit the auxiliary indication information. Further, when the auxiliary indication information is transmitted on the last 1024 chips of each timeslot on the AICH, a channel that carries the auxiliary indication information and the AICH channel on which the AI is detected may use different channelization codes, that is, the AI and the auxiliary indication information are sent in a time division manner and a code division manner.

Specifically, in this embodiment, resources may be indicated in the resource indication manner in the foregoing Table 1. To avoid repetition, details are not described herein again.

When a value of the auxiliary indication information is K, the UE may determine that the resource index range indicated by the EAI information is from A to B, where $A=(X+31\times K+1) \bmod M$, $B=(X+31\times K+31) \bmod M$, K is an integer greater than or equal to 0, M is a total quantity of uplink transmission resources that can be allocated to the UE, and X is a resource index of the default resource corresponding to the random access preamble.

Specifically, X may be a resource index of a default resource corresponding to an access signature selected by the UE. When K is 0 or none is sent, the resource index range indicated by the EAI information may be from $(X+1) \bmod M$ to $(X+31) \bmod M$; or when K is 1, the resource index range indicated by the EAI information may be from $(X+32) \bmod M$ to $(X+62) \bmod M$.

The UE may determine the resource index X of the default resource as the resource index of the target resource when the AI information is the ACK; or determine a resource index corresponding to the value of the EAI information as the resource index of the target resource when the AI information is the negative acknowledgement (NACK). When the AI information is the NACK and the EAI information is the NACK, the UE obtains no resource in this random access process.

Optionally, in another embodiment, when the PRACH corresponds to an AICH and the random access parameter includes a serial number of the AICH and at least one time interval, the AI information and the EAI information are sent on the AICH, and the auxiliary indication information is a serial number of a time interval at which the EAI information is detected. The serial number of the AICH may be a channelization code of the AICH channel.

It should be understood that, after sending the random access preamble to the base station, the UE separately detects feedback information on the AICH at the at least one time interval provided in the random access parameter. For example, the random access parameter may include multiple time intervals such as 7680 chips, 12800 chips, and 20480 chips. It indicates that the UE separately detects feedback information on 7680 chips, 12800 chips, and 20480 chips after sending the random access preamble, until the random access process terminates. The auxiliary indication information is the serial number of the time interval at which the EAI information is detected. The serial number may indicate that the EAI information is detected at an Nth time interval. For example, if the UE detects the EAI on the 7680 chips, the serial number of the corresponding time interval is 0, and the UE does not perform detection at a next time interval. N is an integer greater than or equal to 0. Preferably, the UE may number time intervals starting from 0 according to an order of the time intervals configured by a network side.

In this embodiment, resources may also be indicated in the resource indication manner in the foregoing Table 1.

When a value of the auxiliary indication information is K, the UE may determine that the resource index range indicated by the EAI information is from A to B, where $A=(X+31\times K+1) \bmod M$, $B=(X+31\times K+31) \bmod M$, K is an integer greater than or equal to 0, M is a total quantity of uplink transmission resources that can be allocated to the UE, and X is a resource index of a default resource corresponding to the random access preamble.

Specifically, when K equals to 0 (for example, in the above, the EAI information is detected at the time interval of 7680 chips), the resource index range indicated by the EAI information may be from $(X+1) \bmod M$ to $(X+31) \bmod M$; or when K equals to 1 (for example, in the above, the EAI information is detected at the time interval of 12800 chips), the resource index range indicated by the EAI information may be from $(X+32) \bmod M$ to $(X+62) \bmod M$; or when K equals to 2 (for example, in the above, the EAI information is detected at the time interval of 20480 chips), the resource index range indicated by the EAI information may be from $(X+63) \bmod M$ to $(X+93) \bmod M$.

Similarly, the UE may determine the resource index of the default resource as the resource index of the target resource when the AI information is the ACK; or determine a resource index corresponding to the value of the EAI information as the resource index of the target resource when the AI information is the negative acknowledgement (NACK). When the AI information is the NACK and the EAI information is the NACK, the UE obtains no resource in this random access process.

Optionally, in another embodiment, when the PRACH corresponds to at least two AICHs, the random access parameter may include serial numbers of the at least two AICHs corresponding to the PRACH. The AI information and the EAI information are sent on the at least two AICHs, and the auxiliary indication information is a serial number of the AICH that carries the EAI information when the EAI is detected. The serial number in the random access parameter is directly sent by the network side. Alternatively, the serial number may be indirectly obtained by the UE by numbering the AICHs starting from 0 according to an order of AICH configuration information sent by the network side; or may be explicitly configured by the network side by using signaling.

Preferably, when one PRACH corresponds to multiple AICHs, if the default resource is unavailable, the feedback information may include only the EAI information, and may not include the AI information. That is, no AI information is sent on any AICH.

It should be understood that the AI information and the EAI information may be sent on the at least one AICH in the following manner: The AI information and the EAI information may be sent on one AICH; or the AI information and the EAI information may be sent on different AICHs.

The AI information and the EAI information are sent on the at least two AICHs in two manners.

For a manner 1, the AI information can be sent on only one AICH in the at least two AICHs, and only the EAI information can be sent on a remaining AICH.

If the serial number of the AICH that carries the EAI information is K and K is an integer greater than or equal to 0, in this embodiment, resources may also be indicated in the resource indication manner in the foregoing Table 1.

When a value of the auxiliary indication information is K, the UE may determine that the resource index range indicated by the EAI information is from A to B, where $A=(X+31\times K+1) \bmod M$, $B=(X+31\times K+31) \bmod M$, K is an integer greater than or equal to 0, M is a total quantity of uplink transmission resources that can be allocated to the UE, and X is a resource index of the default resource corresponding to the random access preamble.

Specifically, when the serial number K of the AICH that carries the EAI information equals to 0, the resource index range indicated by the EAI information may be from $(X+1) \bmod M$ to $(X+31) \bmod M$; or when the serial number K of the AICH that carries the EAI information equals to 1, the resource index range indicated by the EAI information may be from $(X+32) \bmod M$ to $(X+62) \bmod M$; or when the serial number K of the AICH that carries the EAI information equals to 2, the resource index range indicated by the EAI information may be from $(X+63) \bmod M$ to $(X+93) \bmod M$.

Similarly, the UE may determine the resource index of the default resource as the resource index of the target resource when the AI information is the ACK; or determine a resource index corresponding to the value of the EAI information as the resource index of the target resource when the AI information is the negative acknowledgement (NACK). When the AI information is the NACK and the EAI information is the NACK, the UE obtains no resource in this random access process.

For a manner 2, the AI information and the EAI information can be sent on each AICH in the at least two AICHs, but are sent on only one AICH at one time interval.

Specifically, if it is assumed that resource indexes of default resources respectively corresponding to the at least two AICHs are X, Y, Z, and the like, in this case, resource index ranges indicated by the EAI information sent on the AICHs may be respectively: from $(X+1) \bmod M$ to $(X+31) \bmod M$, from $(Y+1) \bmod M$ to $(Y+31) \bmod M$, from $(Z+1) \bmod M$ to $(Z+31) \bmod M$, and the like.

Similarly, the UE may determine the resource index of the default resource as the resource index of the target resource when the AI information is the ACK; or when the AI information is the NACK, determine the resource index range indicated by the EAI information and determine a resource index corresponding to the value of the EAI information as the resource index of the target resource.

For example, if the PRACH corresponds to two AICHs, in this embodiment, resources may be indicated in the resource indication manner in the foregoing Table 2. To avoid repetition, details are not described herein again.

X is a resource index of a default resource on an AICH.
Y is a resource index of a default resource on another AICH.

It should be understood that resources may also be indicated in the resource indication manner in Table 2 when a quantity of AICHs is 3, 4, or the like. For example, if a resource index of a default resource on a third AICH is Z, a resource index range indicated by EAI information on the third AICH is from $(Z+1) \bmod M$ to $(Z+31) \bmod M$, and the rest can be deduced from this.

In this embodiment of the present invention, auxiliary indication information is detected and feedback information sent by a base station is detected on an acquisition indicator channel, and both the auxiliary indication information and the feedback information are used to indicate a target resource allocated to user equipment in more than 32 sets of extended uplink transmission resources. Therefore, in this embodiment of the present invention, the extended uplink transmission resources can be indicated.

Figure 5:
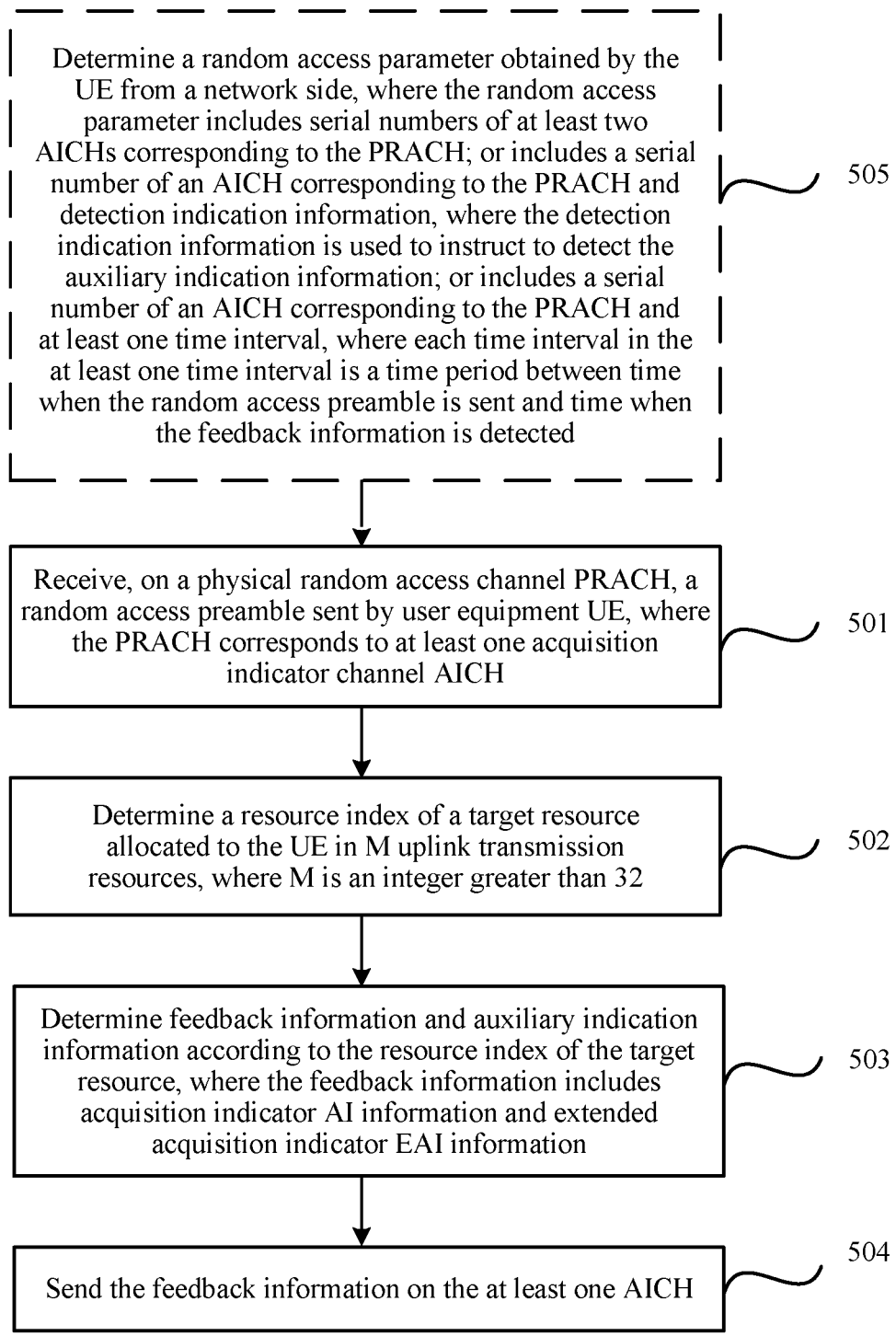
FIG. 5 is a schematic flowchart of a resource indication method according to another embodiment of the present invention.

FIG. 5 is a schematic flowchart of a resource indication method according to another embodiment of the present invention. The method 500 may be executed by a base station, and the base station 30 involved in FIG. 3 may be applicable to the method 500. The method 500 includes:

501. Receive, on a physical random access channel (PRACH), a random access preamble sent by user equipment (UE), where the PRACH corresponds to at least one acquisition indicator channel (AICH).

502. Determine a resource index of a target resource allocated to the UE in M uplink transmission resources, where M is an integer greater than 32.

503. Determine feedback information and auxiliary indication information according to the resource index of the target resource, where the feedback information includes acquisition indicator (AI) information and extended acquisition indicator (EAI) information.

504. Send the feedback information on the at least one AICH.

In this embodiment of the present invention, auxiliary indication information is detected and feedback information sent by a base station is detected on an acquisition indicator channel, and both the auxiliary indication information and the feedback information are used to indicate a target resource allocated to user equipment in more than 32 sets of extended uplink transmission resources. Therefore, in this embodiment of the present invention, the extended uplink transmission resources can be indicated.

It should be understood that the UE may detect, on a same AICH, the AI information and the EAI information that are sent by the base station, or may separately detect the AI information and the EAI information on different AICHs. Both the detected AI information and EAI information may indicate the target resource, that is, a resource used for uplink transmission.

The feedback information sent by the base station on the AICH may include the acquisition indicator (AI) information and the extended acquisition indicator (EAI) information, or may include only the EAI information, or may include only the AI information. That is, the base station may send only the EAI or may send both the AI and the EAI through the AICH. The AI and the EAI may be acknowledgements (ACK), or may be negative acknowledgements (NACK). If both values of the AI and the EAI in the feedback information are the NACKs, a random access process of the UE is rejected, that is, the UE obtains no available resource in this random access process.

Optionally, in an embodiment, in step 503, when the resource index of the target resource is a resource index X of a default resource, the base station may determine that the AI information is an acknowledgement (ACK); or when the resource index of the target resource is a resource index of a non-default resource, that is, when the resource index of the target resource is not X, according to the resource index of the target resource, the base station may determine the auxiliary indication information and the EAI information and determine that the AI information is a NACK.

It should be understood that the AI information may indicate whether the default resource is available and the EAI information may indicate whether another resource is available. Different values of the EAI information correspond to resource indexes of different resources. For example, when the UE uses a default resource corresponding to the random access preamble, the base station may determine that the AI information is the ACK. For example, when the resource index of the default resource is X and the UE performs uplink data transmission by using the corresponding default resource whose resource index is X, the base station may determine that the AI information is the ACK.

Optionally, in another embodiment, the method 500 further includes:

505. Determine a random access parameter obtained by the UE from a network side, where the random access parameter includes serial numbers of at least two AICHs corresponding to the PRACH; or includes a serial number of an AICH corresponding to the PRACH and detection indication information, where the detection indication information is used to instruct to detect the auxiliary indication information; or includes a serial number of an AICH corresponding to the PRACH and at least one time interval, where each time interval in the at least one time interval is a time period between time when the random access preamble is sent and time when the feedback information is detected.

Step 505 may be performed before step 501. Preferably, an RNC sends the random access parameter to a NodeB. The random access parameter may include information about the PRACH, and a related parameter used for random access such as a serial number of at least one AICH corresponding to the PRACH, or a time interval at which the UE sends a random access preamble. After obtaining the random access parameter, the base station may detect, according to the random access parameter, the random access preamble sent by the UE. After receiving the random access preamble sent by the UE, the base station may send the feedback information to the UE on the AICH. The feedback information indicates that the UE can use no resource or indicates a serial number of a resource that can be used by the UE. The UE may detect, on the AICH, the feedback information sent by the base station.

Optionally, a serial number of the AICH may be a channelization code of the AICH. When the PRACH corresponds to one AICH, the random access parameter may include a serial number of the AICH corresponding to the PRACH; or when the PRACH corresponds to at least two AICHs, the random access parameter may include serial numbers of the at least two AICHs corresponding to the PRACH.

The detection indication information may be used to indicate that the base station may send the auxiliary indication information.

Optionally, in an embodiment, when the PRACH corresponds to an AICH and the random access parameter includes a serial number of the AICH and the detection indication information, the AI information, the EAI information, and the auxiliary indication information are sent on the AICH, and the auxiliary indication information is sent on the last 1024 chips of a timeslot in which the AI information and the EAI information are received.

The base station sends the AI information and the EAI information on the AICH, and further sends the auxiliary indication information on the same AICH. That is, in this case, one PRACH corresponds to only one AICH. Optionally, there is a total of 8 bits of spare information on the last 1024 chips of each timeslot on the AICH. The spare information may be used to carry the auxiliary indication information.

Optionally, a part of the spare information of the last 1024 chips of each timeslot on the current AICH may be used to transmit the auxiliary indication information. Further, when the auxiliary indication information is transmitted on the last 1024 chips of each timeslot on the AICH, a channel that carries the auxiliary indication information and the AICH channel on which the AI is sent may use different channelization codes, that is, the AI and the auxiliary indication information are sent in a time division manner and a code division manner.

Specifically, in this embodiment, resources may be indicated in the resource indication manner in the foregoing Table 1. To avoid repetition, details are not described herein again.

When a resource index range of the target resource is from A to B, where $A=(X+31\times K+1)\mod M$, and $B=(X+31\times K+31)\mod M$, the base station may determine that the auxiliary indication information is K, where K is an integer greater than or equal to 0, and X is a resource index of a default resource corresponding to the random access preamble.

Specifically, X may be a resource index of a default resource corresponding to an access signature selected by the UE. When the resource index range of the target resource is from $(X+1)\mod M$ to $(X+31)\mod M$, the base station may determine that K is 0 or none is sent; or when the resource index range of the target resource is from $(X+32)\mod M$ to $(X+62)\mod M$, the base station may determine that K is 1.

Using X equaling to 0 as an example, when the target resource index is 34, the base station determines that the default resource is unavailable and that the AI is the NACK, and determines that the auxiliary indication information K is 1 and that the resource index indicated by the EAI information is 34. The resource index value 34 indicated by the EAI is obtained by calculation, instead of being directly sent to the UE by using the EAI.

The base station may determine that the AI information is the acknowledgement (ACK), when the resource index of the target resource is the resource index of the default resource; or determine that the AI information is the negative acknowledgement (NACK), when the resource index of the target resource is a resource index of a non-default resource. When the UE obtains no available resource, the AI information and the EAI information are NACKs.

Optionally, in another embodiment, when the PRACH corresponds to an AICH and the random access parameter includes a serial number of the AICH and at least one time interval, the AI information and the EAI information are sent on the AICH, and the auxiliary indication information is a serial number of a time interval at which the EAI information is sent. The serial number of the AICH may be a channelization code of the AICH channel.

It should be understood that, after sending the random access preamble to the base station, the UE separately detects feedback information on the AICH at the at least one time interval provided in the random access parameter. For example, the random access parameter may include multiple time intervals such as 7680 chips, 12800 chips, and 20480 chips. It indicates that the UE separately detects feedback information on 7680 chips, 12800 chips, and 20480 chips after sending the random access preamble, until the random access process terminates. Correspondingly, after detecting the access preamble sent by the UE, the base station may send feedback information at any one of the foregoing time intervals. According to the resource index of the target resource, the base station determines to send the feedback information at a Kth time interval and determines a value of the feedback information. Using X equaling to 0 as an example, if the target resource index is 3, the base station sends the EAI at an interval of 7680 chips after detecting the preamble, and in this case, the auxiliary indication information K is 0. Preferably, the base station may number time intervals starting from 0 according to an order of the time intervals configured by a network side.

In this embodiment, resources may also be indicated in the resource indication manner in the foregoing Table 1. To avoid repetition, details are not described herein again.

When a resource index range of the target resource is from A to B, where $A=(X+31\times K+1)\mod M$, and $B=(X+31\times K+31)\mod M$, the base station may determine that the auxiliary indication information is K, where K is an integer greater than or equal to 0, and X is a resource index of a default resource corresponding to the random access preamble.

Specifically, if the resource index of the target resource is Y, when the resource index range of the target resource is from $(X+1)\mod M$ to $(X+31)\mod M$, the base station may determine that K equals to 0 (for example, in the above, the EAI information is detected at the time interval of 7680 chips); or when the resource index range of the target resource is from $(X+32)\mod M$ to $(X+62)\mod M$, the base station may determine that K equals to 1 (for example, in the above, the EAI information is detected at the time interval of 12800 chips); or when the resource index range of the target resource is from $(X+63)\mod M$ to $(X+93)\mod M$, the base station may determine that K equals to 2 (for example, in the above, the EAI information is detected at the time interval of 20480 chips).

Using a default resource index being 1 as an example, when a value of the target resource index is 3, the base station may send feedback information at an interval of 7680 chips after detecting the access preamble; or when a value of the target resource index is 43, the base station may send feedback information at an interval of 12800 chips after detecting the access preamble; or when a value of the target resource index is 83, the base station may send feedback information at an interval of 20480 chips after detecting the access preamble.

Similarly, the base station may determine that the AI information is the acknowledgement (ACK), when the resource index of the target resource is the resource index of the default resource; or determine that the AI information is the negative acknowledgement (NACK), when the resource index of the target resource is a resource index of a non-default resource. When the UE obtains no available resource, the AI information and the EAI information are NACKs.

Optionally, in another embodiment, when the PRACH corresponds to at least two AICHs, the random access parameter may include serial numbers of the at least two AICHs corresponding to the PRACH. The AI information and the EAI information are sent on the at least two AICHs, and the auxiliary indication information is a serial number of the AICH that carries the EAI information when the EAI is detected. The serial number in the random access parameter is directly sent by the network side. Alternatively, the serial number may be indirectly obtained by the UE by numbering the AICHs starting from 0 according to an order of AICH configuration information sent by the network side; or may be explicitly configured by the network side by using signaling.

Preferably, when one PRACH corresponds to multiple AICHs, if the default resource is unavailable, the feedback information may include only the EAI information, and may not include the AI information. That is, no AI information is sent on any AICH.

It should be understood that the AI information and the EAI information may be sent on the at least one AICH in the following manner: The AI information and the EAI information may be sent on one AICH; or the AI information and the EAI information may be sent on different AICHs.

The AI information and the EAI information are sent on the at least two AICHs in two manners.

For a manner 1, the AI information can be sent on only one AICH in the at least two AICHs, and only the EAI information can be sent on a remaining AICH.

According to the resource index of the target resource, it is determined that the serial number of the AICH that carries the EAI information is K, where K is an integer greater than or equal to 0. Therefore, in this embodiment, resources may also be indicated in the resource indication manner in the foregoing Table 1.

When a resource index range of the target resource is from A to B, where A=(X+31×K+1)mod M, and B=(X+31×K+31)mod M, the base station may determine that the auxiliary indication information is K, where K is an integer greater than or equal to 0, and X is a resource index of a default resource corresponding to the random access preamble.

Specifically, when the resource index range of the target resource is from (X+1)mod M to (X+31)mod M, the base station may determine that the serial number K of the AICH that carries the EAI information equals to 0; or when the resource index range of the target resource is from (X+32)mod M to (X+62)mod M, the base station may determine that the serial number K of the AICH that carries the EAI information equals to 1; or when the resource index range of the target resource is from (X+63)mod M to (X+93)mod M, the base station may determine that the serial number K of the AICH that carries the EAI information equals to 2.

Similarly, the base station may determine that the AI information is the acknowledgement (ACK), when the resource index of the target resource is the resource index of the default resource; or determine that the AI information is the negative acknowledgement (NACK), when the resource index of the target resource is a resource index of a non-default resource. When the UE obtains no available resource, the AI information and the EAI information are NACKs.

For a manner 2, the AI information and the EAI information can be sent on each AICH in the at least two AICHs, but are sent on only one AICH at one time interval.

Specifically, if it is assumed that resource indexes of default resources respectively corresponding to the at least two AICHs are X, Y, Z, and the like, in this case, resource index ranges indicated by the EAI information sent on the AICHs may be respectively: from (X+1)mod M to (X+31)mod M, from (Y+1)mod M to (Y+31)mod M, from (Z+1)mod M to (Z+31)mod M, and the like.

Similarly, the base station may determine that the AI information is the acknowledgement (ACK), when the resource index of the target resource is the resource index of the default resource; or determine that the AI information is the negative acknowledgement (NACK), when the resource index of the target resource is a resource index of a non-default resource. When the UE obtains no available resource, the AI information and the EAI information are NACKs.

For example, if the PRACH corresponds to two AICHs, in this embodiment, resources may be indicated in the resource indication manner in the foregoing Table 2. To avoid repetition, details are not described herein again.

X is a resource index of a default resource on an AICH.
Y is a resource index of a default resource on another AICH.

It should be understood that resources may also be indicated in the resource indication manner in Table 2 when a quantity of AICHs is 3, 4, or the like. For example, if a resource index of a default resource on a third AICH is Z, a resource index range indicated by EAI information on the third AICH is from (Z+1)mod M to (Z+31)mod M, and the rest can be deduced from this.

In this embodiment of the present invention, auxiliary indication information is detected and feedback information sent by a base station is detected on an acquisition indicator channel, and both the auxiliary indication information and the feedback information are used to indicate a target resource allocated to user equipment in more than 32 sets of extended uplink transmission resources. Therefore, in this embodiment of the present invention, the extended uplink transmission resources can be indicated.

Figure 6:
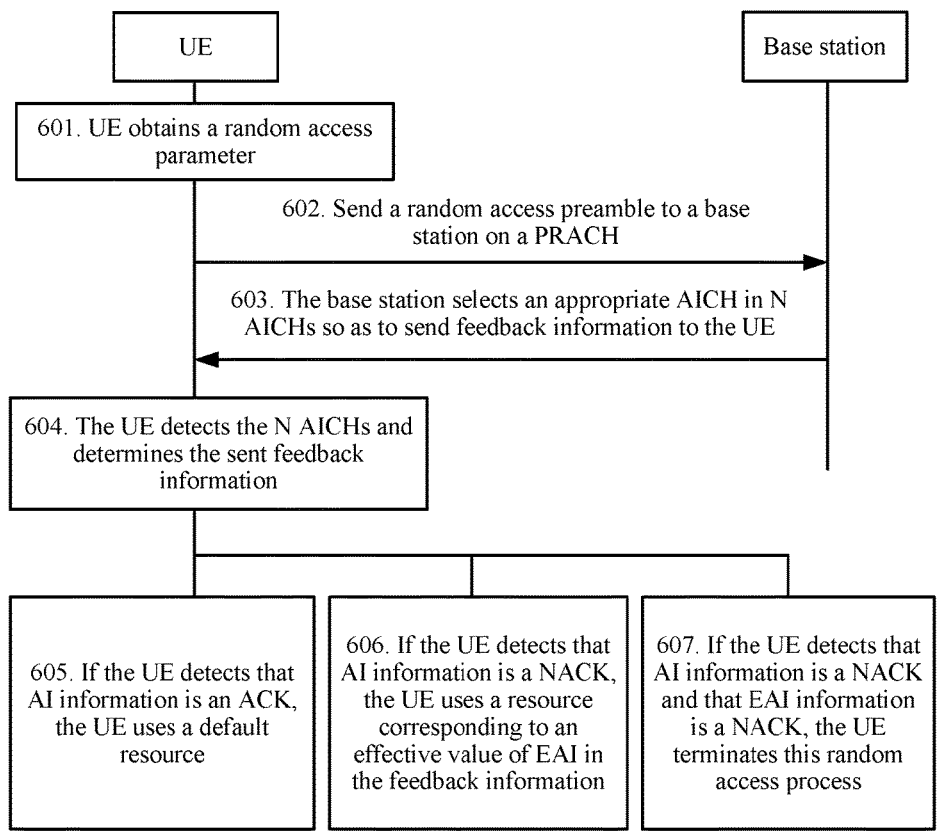
FIG. 6 is a schematic flowchart of a resource indication process according to an embodiment of the present invention.

FIG. 6 is a schematic flowchart of a resource indication process according to an embodiment of the present invention. As shown in FIG. 6, the process includes:

601. UE obtains a random access parameter.

Specifically, the UE may obtain the random access parameter from a network side. The random access parameter may include information about N AICHs corresponding to a PRACH, and N is an integer greater than 1.

Specifically, the random access parameter may include information about the PRACH, and a related parameter used for random access. The PRACH in the random access parameter corresponds to serial numbers of the N AICHs.

602. Send a random access preamble to a base station on a PRACH.

Specifically, the UE sends the random access preamble to the base station on the PRACH according to the random access parameter sent by the base station.

603. The base station selects an appropriate AICH in N AICHs so as to send feedback information to the UE.

It should be understood that the feedback information may include AI information and EAI information, or may include only EAI information. The base station can send the AI information and the EAI information on a first AICH in the N AICHs and send only the EAI on remaining N−1 AICHs. In each specific sending process, the base station can send the feedback information on a maximum of two AICHs at the same time.

604. The UE detects the N AICHs and determines the sent feedback information.

605. If the UE detects that AI information is an ACK, the UE uses a default resource.

Specifically, if a resource index of the default resource is X, the UE uses the default resource corresponding to X.

606. If the UE detects that AI information is a NACK, the UE uses a resource corresponding to an effective value of EAI in the feedback information.

Specifically, if the EAI information on the first AICH is an effective value, a resource index range indicated by the EAI information is from (X+1)mod M to (X+31)mod M, and the UE may use a resource indicated by a resource index corresponding to the value of the EAI information on the first AICH. Similarly, if EAI information of an AICH in the N−1 AICHs is an effective value, a resource index range indicated by the EAI information may be from (X+32)mod M to (X+62)mod M, and the UE may use a resource indicated by a resource index corresponding to the value of the EAI information.

That is, if a serial number of the AICH that carries the EAI information is K and K is an integer greater than or equal to 0, the resource index range indicated by the EAI information may be from $(X+31+\times K+1)\bmod M$ to $(X+31\times K+31)\bmod M$.

607. If the UE detects that AI information is a NACK and that EAI information is a NACK, the UE terminates this random access process.

Figure 7:
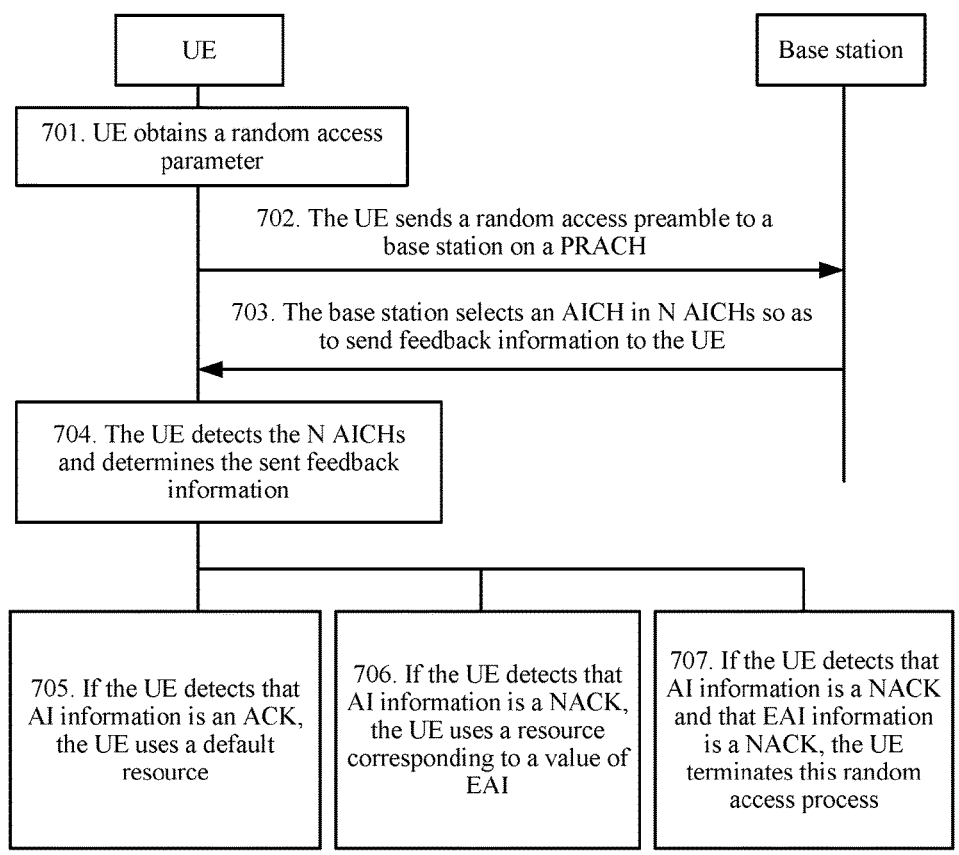
FIG. 7 is a schematic flowchart of a resource indication process according to another embodiment of the present invention.

FIG. 7 is a schematic flowchart of a resource indication process according to another embodiment of the present invention. As shown in FIG. 7, the process includes:

701. UE obtains a random access parameter.

Specifically, the UE may obtain the random access parameter from a network side. The random access parameter may include serial numbers of N AICHs corresponding to a PRACH, and N is an integer greater than 1.

Specifically, the random access parameter may include information about the PRACH, and a related parameter used for random access. The PRACH in the random access parameter corresponds to the serial numbers of the N AICHs.

702. The UE sends a random access preamble to a base station on a PRACH.

703. The base station selects an AICH in N AICHs so as to send feedback information to the UE.

The base station may send AI information and EAI information on each AICH in the N AICHs.

704. The UE detects the N AICHs and determines the sent feedback information.

705. If the UE detects that AI information is an ACK, the UE uses a default resource.

Specifically, if a resource index of a default resource on a first AICH is X, the UE uses the default resource corresponding to X.

706. If the UE detects that AI information is a NACK, the UE uses a resource corresponding to a value of EAI.

Specifically, if a resource index of a default resource on a first AICH is X, a resource index range indicated by EAI information on the first AICH is from $(X+1)\bmod M$ to $(X+31)\bmod M$, and when AI information on the first AICH is a NACK, the UE may use a resource indicated by a resource index corresponding to a value of the EAI information on the first AICH. Similarly, if a resource index of a default resource on a second AICH is Y, a resource index range indicated by EAI information on the second AICH is from $(Y+1)\bmod M$ to $(Y+31)\bmod M$, and when AI information on the second AICH is a NACK, the UE may use a resource indicated by a resource index corresponding to a value of the EAI information on the second AICH. Similarly, if a resource index of a default resource on an Nth AICH is Z, a resource index range indicated by EAI information on the Nth AICH is from $(Z+1)\bmod M$ to $(Z+31)\bmod M$, and when AI information on the Nth AICH is a NACK, the UE may use a resource indicated by a resource index corresponding to a value of the EAI information on the Nth AICH. Details are not described in this embodiment of the present invention.

707. If the UE detects that AI information is a NACK and that EAI information is a NACK, the UE terminates this random access process.

Figure 8:
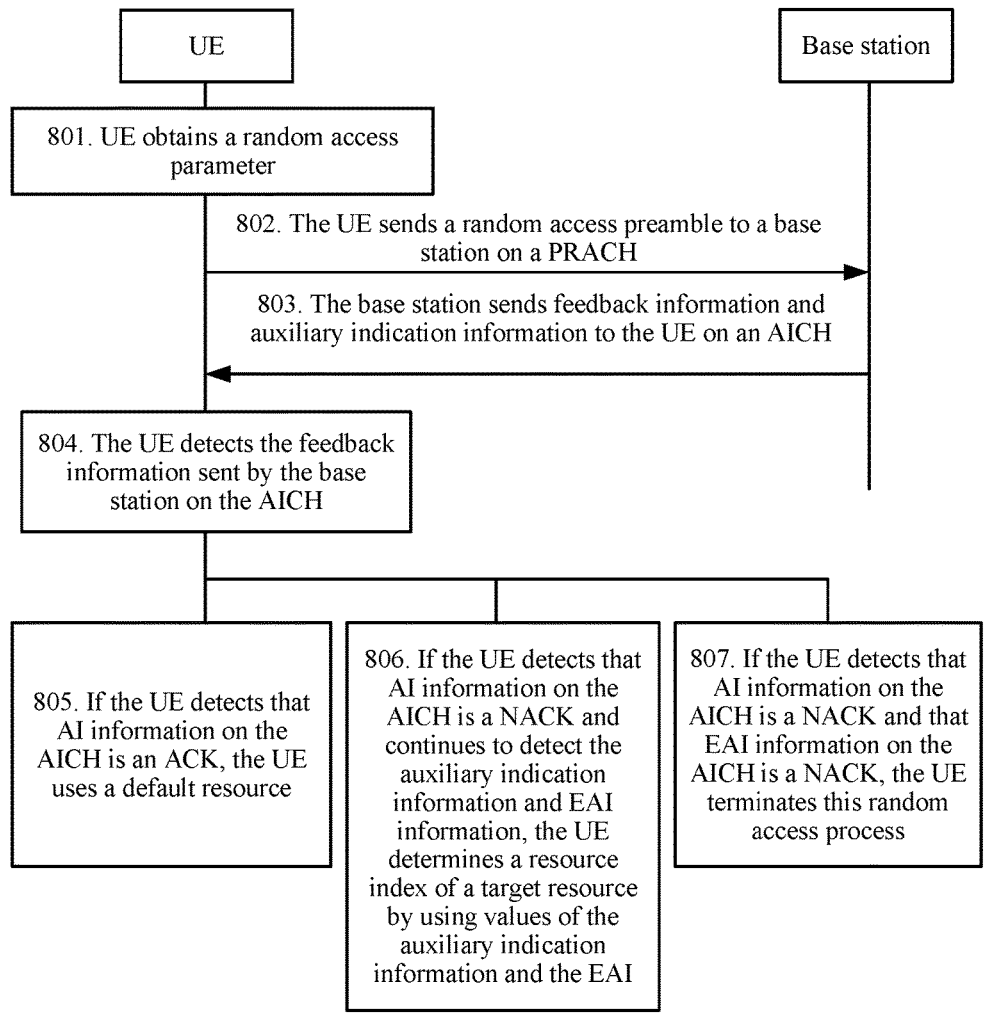
FIG. 8 is a schematic flowchart of a resource indication process according to another embodiment of the present invention.

FIG. 8 is a schematic flowchart of a resource indication process according to another embodiment of the present invention. As shown in FIG. 8, the process includes:

801. UE obtains a random access parameter.

Specifically, the UE may obtain the random access parameter from a network side. The random access parameter may include information about a PRACH, and a related parameter used for random access. The PRACH in the random access parameter corresponds to a serial number of an AICH.

802. The UE sends a random access preamble to a base station on a PRACH.

803. The base station sends feedback information and auxiliary indication information to the UE on an AICH.

804. The UE detects the feedback information sent by the base station on the AICH.

805. If the UE detects that AI information on the AICH is an ACK, the UE uses a default resource.

Specifically, if a resource index of the default resource on the AICH is X, the UE uses the default resource corresponding to X.

806. If the UE detects that AI information on the AICH is a NACK and continues to detect the auxiliary indication information and EAI information, the UE determines a resource index of a target resource by using values of the auxiliary indication information and the EAI.

Optionally, the auxiliary indication information may be represented by using a total of 8 bits of spare information on the last 1024 chips of each timeslot on the AICH.

Specifically, if a resource index of a default resource on the AICH is X and the auxiliary indication information is 0 or not sent, a resource index range indicated by the EAI information on the AICH is from $(X+1)\bmod M$ to $(X+31)\bmod M$, where M is a total quantity of E-DCH resources in a cell. If the auxiliary indication information is 1, a resource index range indicated by the EAI information on the AICH is from $(X+32)\bmod M$ to $(X+62)\bmod M$, and the rest can be deduced from this.

That is, if a serial number of the AICH that carries the EAI information is K and K is an integer greater than or equal to 0, the resource index range indicated by the EAI information may be from $(X+31\times K+1)\bmod M$ to $(X+31\times K+31)\bmod M$.

807. If the UE detects that AI information on the AICH is a NACK and that EAI information on the AICH is a NACK, the UE terminates this random access process.

Figure 9:
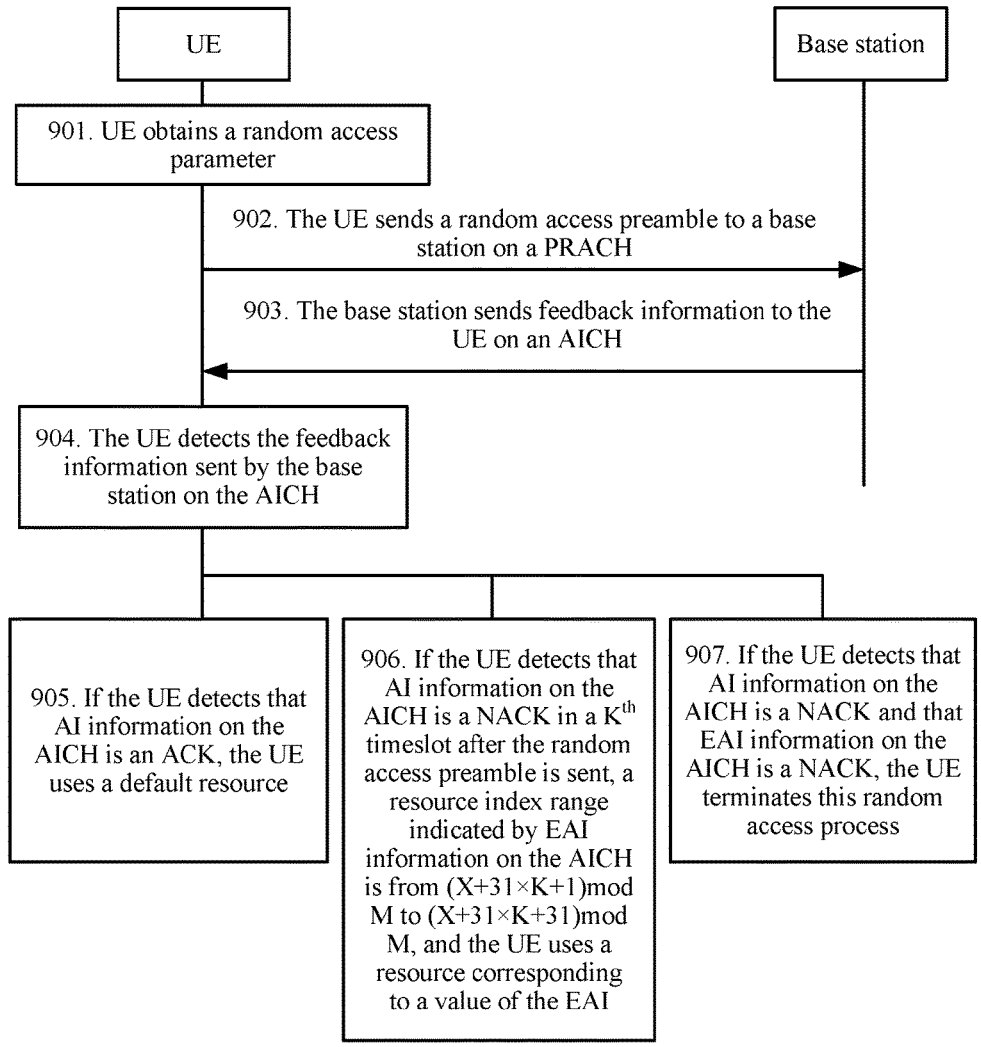
FIG. 9 is a schematic flowchart of a resource indication process according to another embodiment of the present invention.

FIG. 9 is a schematic flowchart of a resource indication process according to another embodiment of the present invention. As shown in FIG. 9, the process includes:

901. UE obtains a random access parameter.

Specifically, the random access parameter includes serial numbers of at least two time intervals at which the UE sends a random access preamble and detects feedback information on an AICH.

It should be understood that a time interval at which a base station sends the feedback information may be a current time interval at which the base station sends the feedback information or may be a preset time interval at which the feedback information is sent, and this is not limited in the present invention.

902. The UE sends a random access preamble to a base station on a PRACH.

903. The base station sends feedback information to the UE on an AICH.

904. The UE detects the feedback information sent by the base station on the AICH.

905. If the UE detects that AI information on the AICH is an ACK, the UE uses a default resource.

Specifically, if a resource index of the default resource on the AICH is X, the UE uses the default resource corresponding to X.

906. If the UE detects that AI information on the AICH is a NACK in a Kth timeslot after the random access preamble is sent, a resource index range indicated by EAI information on the AICH is from (X+31×K+1)mod M to (X+31×K+31) mod M, and the UE uses a resource corresponding to a value of the EAI.

When the AI information is an ACK and the resource index of the default resource is X, a target resource allocated to the UE is a resource corresponding to the resource index X; or when the AI information is the NACK, the resource index range indicated by the EAI information may be from A=(X+31×K+1)mod M to B=(X+31×K+31)mod M, and a resource index corresponding to the value of the EAI information in the resource index range is selected as a resource index of a target resource.

907. If the UE detects that AI information on the AICH is a NACK and that EAI information on the AICH is a NACK, the UE terminates this random access process.

Figure 10:
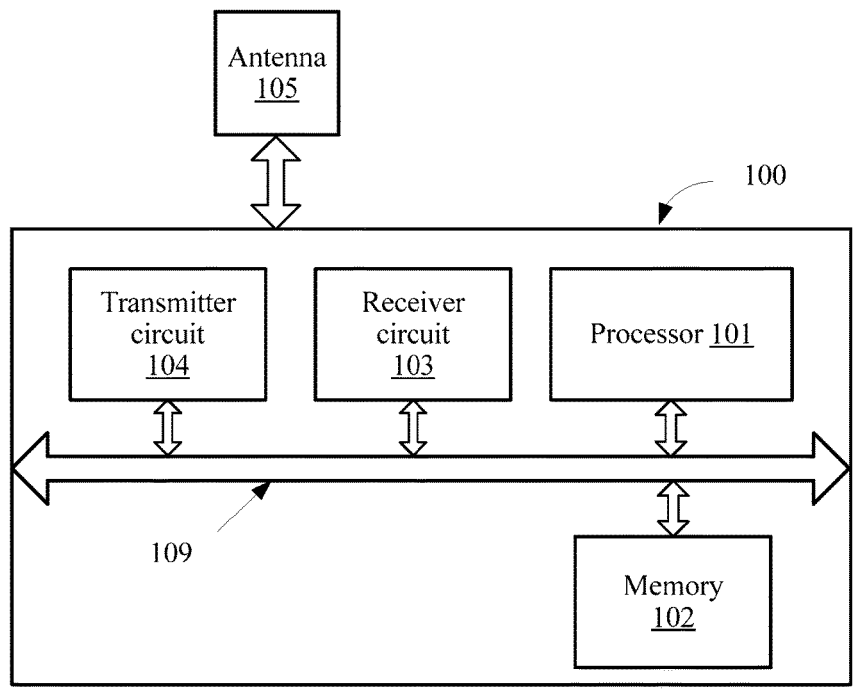
FIG. 10 is a block diagram of user equipment according to another embodiment of the present invention.

FIG. 10 is a block diagram of user equipment according to another embodiment of the present invention. The user equipment 100 in FIG. 10 may be configured to implement steps and methods in the foregoing method embodiments. The user equipment 100 in FIG. 10 includes a processor 101, a memory 102, a receiver circuit 103, and a transmitter circuit 104. The processor 101, the memory 102, and the receiver circuit 103 are connected by using a bus system 109.

In addition, the user equipment 100 may further include an antenna 105, or the like. The processor 101 controls an operation of the user equipment 100. The memory 102 may include a read-only memory and a random access memory, and provide an instruction and data for the processor 101. A part of the memory 102 may further include a nonvolatile random access memory (NVRAM). In a specific application, the transmitter circuit 104 and the receiver circuit 103 may be coupled to the antenna 105. Components of the user equipment 100 are coupled together by using the bus system 109. The bus system 109 further includes a power bus, a control bus, and a status signal bus in addition to a data bus. However, for clarity of description, various buses are marked as the bus system 109 in the figure.

The processor 101 may be an integrated circuit chip and have a signal processing capability. The foregoing processor 101 may be a general purpose processor, a digital signal processor (DSP), an application-specific integrated circuit (ASIC), a field programmable gate array (FPGA) or another programmable logic device, a discrete gate or a transistor logic device, or a discrete hardware component. The methods, the steps, and logical block diagrams that are disclosed in the embodiments of the present invention may be implemented or executed. The general purpose processor may be a microprocessor, or the processor may be any conventional processor, or the like. The processor 101 reads information from the memory 102 and controls the components of the user equipment 100 by using hardware of the memory 102.

The method in FIG. 4 may be implemented by the user equipment 100 in FIG. 10. To avoid repetition, details are not described again.

Specifically, under control of the processor 101, the user equipment 100 completes the following operations: sending a random access preamble to a base station on a physical random access channel (PRACH), where the PRACH corresponds to at least one acquisition indicator channel (AICH); detecting auxiliary indication information and detecting, on the at least one AICH, feedback information sent by the base station, where the feedback information includes acquisition indicator (AI) information and extended acquisition indicator (EAI) information; and determining, according to the feedback information and the auxiliary indication information, a resource index of a target resource allocated by the base station in M uplink transmission resources, where M is an integer greater than 32.

In this embodiment of the present invention, auxiliary indication information is detected and feedback information sent by a base station is detected on an acquisition indicator channel, and both the auxiliary indication information and the feedback information are used to indicate a target resource allocated to user equipment in more than 32 sets of extended uplink transmission resources. Therefore, in this embodiment of the present invention, the extended uplink transmission resources can be indicated.

Optionally, in another embodiment, the processor 101 may determine a resource index of a default resource as the resource index of the target resource when the AI information is the acknowledgement (ACK); or when the AI information is the negative acknowledgement (NACK), the processor 101 may determine, according to the auxiliary indication information, a resource index range indicated by the EAI information and determine a resource index corresponding to the value of the EAI information as the resource index of the target resource.

Optionally, in another embodiment, the receiver circuit 103 may receive a random access parameter, where the random access parameter includes serial numbers of at least two AICHs corresponding to the PRACH; or includes a serial number of an AICH corresponding to the PRACH and detection indication information, where the detection indication information is used to instruct to detect the auxiliary indication information; or includes a serial number of an AICH corresponding to the PRACH and at least one time interval, where each time interval in the at least one time interval is a time period between time when the random access preamble is sent and time when the feedback information is detected.

Optionally, in another embodiment, the PRACH corresponds to an AICH, and the AI information, the EAI information, and the auxiliary indication information are sent on the AICH, where the auxiliary indication information is sent on the last 1024 chips of a timeslot in which the AI information and the EAI information are received.

Optionally, in another embodiment, the PRACH corresponds to an AICH, the AI information and the EAI information are sent on the AICH, and the auxiliary indication information is a serial number of a time interval at which the EAI information is detected. The serial number of the AICH may be a channelization code of the AICH channel.

Optionally, in another embodiment, the AI information and the EAI information are sent on the at least one AICH, and the auxiliary indication information is a serial number of the AICH that carries the EAI information.

Optionally, in another embodiment, when a value of the auxiliary indication information is K, the processor 101 may determine that the resource index range indicated by the EAI information is from A to B, where A=(X+31×K+1)mod M, B=(X+31×K+31)mod M, K is an integer greater than or equal to 0, and X is a resource index of a default resource corresponding to the random access preamble.

Figure 11:
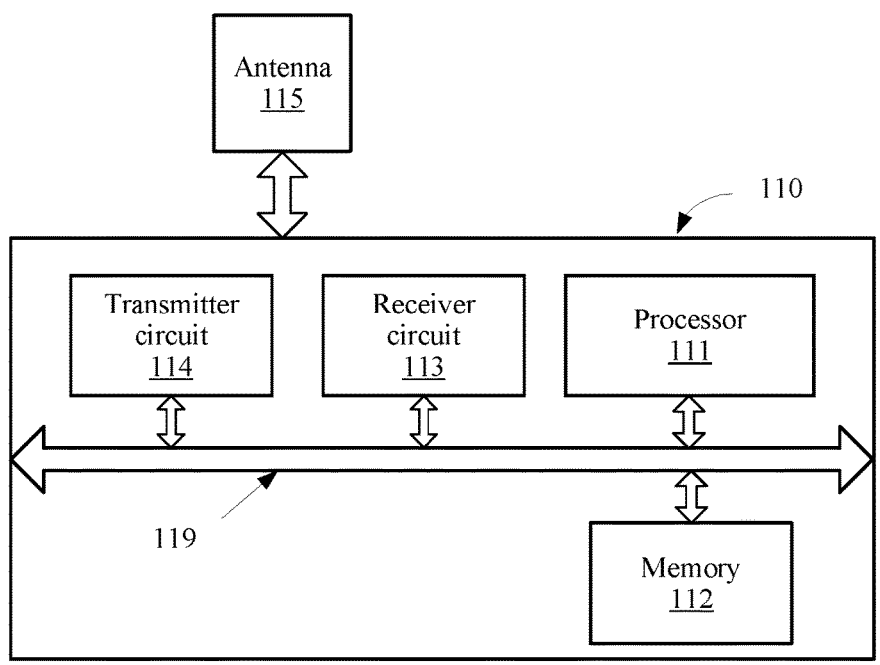
FIG. 11 is a block diagram of a base station according to another embodiment of the present invention.

FIG. 11 is a block diagram of a base station according to another embodiment of the present invention. The base station 110 in FIG. 11 may be configured to implement steps and methods in the foregoing method embodiments. The base station 110 in FIG. 11 includes a processor 111, a memory 112, a receiver circuit 113, and a transmitter circuit 114. The processor 111, the memory 112, and the receiver circuit 113 are connected by using a bus system 119.

In addition, the base station 110 may further include an antenna 115, or the like. The processor 111 controls an operation of the base station 110. The memory 112 may include a read-only memory and a random access memory, and provide an instruction and data for the processor 111. A part of the memory 112 may further include a nonvolatile random access memory (NVRAM). In a specific application, the transmitter circuit 114 and the receiver circuit 113 may be coupled to the antenna 115. Components of the base station 110 are coupled together by using the bus system 119. The bus system 119 further includes a power bus, a control bus, and a status signal bus in addition to a data bus. However, for clarity of description, various buses are marked as the bus system 119 in the figure.

The processor 111 may be an integrated circuit chip and have a signal processing capability. The foregoing processor 111 may be a general purpose processor, a digital signal processor (DSP), an application-specific integrated circuit (ASIC), a field programmable gate array (FPGA) or another programmable logic device, a discrete gate or a transistor logic device, or a discrete hardware component. The methods, the steps, and logical block diagrams that are disclosed in the embodiments of the present invention may be implemented or executed. The general purpose processor may be a microprocessor, or the processor may be any conventional processor, or the like. The processor 111 reads information from the memory 112 and controls the components of the base station 110 by using hardware of the memory 102.

The method in FIG. 5 may be implemented by the base station 110 in FIG. 11. To avoid repetition, details are not described again.

Specifically, under control of the processor 111, the base station 110 completes the following operations: receiving, on a physical random access channel (PRACH), a random access preamble sent by user equipment (UE), where the PRACH corresponds to at least one acquisition indicator channel (AICH); determining a resource index of a target resource allocated to the UE in M uplink transmission resources, where M is an integer greater than 32; determining feedback information and auxiliary indication information according to the resource index of the target resource, where the feedback information includes acquisition indicator (AI) information and extended acquisition indicator (EAI) information; and sending the feedback information on the at least one AICH.

In this embodiment of the present invention, auxiliary indication information is detected and feedback information sent by a base station is detected on an acquisition indicator channel, and both the auxiliary indication information and the feedback information are used to indicate a target resource allocated to user equipment in more than 32 sets of extended uplink transmission resources. Therefore, in this embodiment of the present invention, the extended uplink transmission resources can be indicated.

Optionally, in another embodiment, the processor 111 may determine that the AI information is an acknowledgement (ACK), when the resource index of the target resource is a resource index of a default resource; or determine that the AI information is a NACK, when the resource index of the target resource is a resource index of a non-default resource.

Optionally, in another embodiment, the processor 111 may determine a random access parameter obtained by the UE from a network side, where the random access parameter includes serial numbers of at least two AICHs corresponding to the PRACH; or includes a serial number of an AICH corresponding to the PRACH and detection indication information, where the detection indication information is used to instruct to detect the auxiliary indication information; or includes a serial number of an AICH corresponding to the PRACH and at least one time interval, where each time interval in the at least one time interval is a time period between time when the random access preamble is sent and time when the feedback information is detected.

Optionally, in another embodiment, the PRACH corresponds to an AICH, and the AI information, the EAI information, and the auxiliary indication information are sent on the AICH, where the auxiliary indication information is sent on the last 1024 chips of a timeslot in which the AI information and the EAI information are received.

Optionally, in another embodiment, the PRACH corresponds to an AICH, the AI information and the EAI information are sent on the AICH, and the auxiliary indication information is a serial number of a time interval at which the EAI information is sent. The serial number of the AICH may be a channelization code of the AICH channel.

Optionally, in another embodiment, the AI information and the EAI information are sent on the at least one AICH, and the auxiliary indication information is a serial number of the AICH that carries the EAI information.

Optionally, in another embodiment, when a resource index range of the target resource is from A to B, where A=(X+31×K+1)mod M, and B=(X+31×K+31)mod M, the processor 111 may determine that the auxiliary indication information is K, where K is an integer greater than or equal to 0, and X is a resource index of a default resource corresponding to the random access preamble.

It should be understood that "an embodiment" or "an embodiment" mentioned in the whole specification does not mean that particular features, structures, or characteristics related to the embodiment are included in at least one embodiment of the present invention. Therefore, "in an embodiment" or "in an embodiment" appearing throughout the specification does not refer to a same embodiment. In addition, these particular features, structures, or characteristics may be combined in one or more embodiments by using any appropriate manner. Sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention. Sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

It should be understood that "an embodiment" or "an embodiment" mentioned in the whole specification does not mean that particular features, structures, or characteristics related to the embodiment are included in at least one embodiment of the present invention. Therefore, "in an embodiment" or "in an embodiment" appearing throughout the specification does not refer to a same embodiment. In addition, these particular features, structures, or characteristics may be combined in one or more embodiments by using any appropriate manner. Sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely examples of embodiments of the technical solutions of the present invention, but is not intended to limit the protection scope of the present invention. Any modification, equivalent replacement, or improvement made without departing from principle of the present invention shall fall within the protection scope of the present invention.

What is claimed is:

1. A user equipment, comprising:
a transmitter, configured to send a random access preamble to a base station on a physical random access channel (PRACH), wherein the PRACH corresponds to at least one acquisition indicator channel (AICH); and
a processor, configured to:
  detect auxiliary indication information and detect, on the at least one AICH, feedback information sent by the base station, wherein the feedback information comprises acquisition indicator (AI) information and extended acquisition indicator (EAI) information; and
  determine, according to the feedback information and the auxiliary indication information, a resource index of a target resource allocated by the base station in M uplink transmission resources, wherein M is an integer greater than 32, and
wherein the processor is further configured to:
when the AI information is an acknowledgement (ACK), determine a resource index of a default resource as the resource index of the target resource; or when the AI information is a negative acknowledgement (NACK), determine, according to the auxiliary indication information, a resource index range indicated by the EAI information and determine a resource index corresponding to a value of the EAI information as the resource index of the target resource.

2. The user equipment according to claim 1, further comprising:
a receiver configured to receive a random access parameter, wherein the random access parameter comprises:
serial numbers of at least two AICHs corresponding to the PRACH; or
a serial number of an AICH corresponding to the PRACH and detection indication information, wherein the detection indication information is used to instruct to detect the auxiliary indication information; or
a serial number of an AICH corresponding to the PRACH and at least one time interval, wherein each time interval in the at least one time interval is a time period between time when the random access preamble is sent and time when the feedback information is detected.

3. The user equipment according to claim 2, wherein the PRACH corresponds to an AICH, and the AI information, the EAI information, and the auxiliary indication information are sent on the AICH, wherein the auxiliary indication information is sent on the last 1024 chips of a timeslot in which the AI information and the EAI information are received.

4. The user equipment according to claim 2, wherein the PRACH corresponds to an AICH, the AI information and the EAI information are sent on the AICH, and the auxiliary indication information is a serial number of a time interval at which the EAI information is detected.

5. The user equipment according to claim 2, wherein the AI information and the EAI information are sent on the at least one AICH, and the auxiliary indication information is a serial number of the AICH that carries the EAI information.

6. The user equipment according to claim 3, wherein the processor is further configured to:
when a value of the auxiliary indication information is K, determine that the resource index range indicated by the EAI information is from A to B (including A and B), wherein $A=(X+31\times K+1) \bmod M$, $B=(X+31\times K+31) \bmod M$, K is an integer greater than or equal to 0, and X is a resource index of a default resource corresponding to the random access preamble.

7. A base station, comprising:
a receiver, configured to receive, on a physical random access channel (PRACH), a random access preamble sent by user equipment (UE), wherein the PRACH corresponds to at least one acquisition indicator channel (AICH);
a processor, configured to:
determine a resource index of a target resource allocated to the UE in M uplink transmission resources, wherein M is an integer greater than 32; and
determine feedback information and auxiliary indication information according to the resource index of the target resource, wherein the feedback information comprises acquisition indicator (AI) information and extended acquisition indicator (EAI) information; and
a transmitter, configured to send the feedback information on the at least one AICH, wherein the processor is further configured to:
when the resource index of the target resource is a resource index of a default resource, determine that the AI information is an acknowledgement (ACK); or when the resource index of the target resource is a resource index of a non-default resource, determine that the AI information is a negative acknowledgement (NACK).

8. The base station according to claim 7, wherein the processor is further configured to determine a random access parameter obtained by the UE from a network side, and wherein the random access parameter comprises:
serial numbers of at least two AICHs corresponding to the PRACH; or
a serial number of an AICH corresponding to the PRACH and detection indication information, wherein the detection indication information is used to instruct to detect the auxiliary indication information; or
a serial number of an AICH corresponding to the PRACH and at least one time interval, wherein each time interval in the at least one time interval is a time period between time when the random access preamble is sent and time when the feedback information is detected.

9. The base station according to claim 8, wherein the PRACH corresponds to an AICH, and the AI information, the EAI information, and the auxiliary indication information are sent on the AICH, wherein the auxiliary indication information is sent on the last 1024 chips of a timeslot in which the AI information and the EAI information are received.

10. The base station according to claim 8, wherein the PRACH corresponds to an AICH, the AI information and the EAI information are sent on the AICH, and the auxiliary indication information is a serial number of a time interval at which the EAI information is sent.

11. The base station according to claim 8, wherein the AI information and the EAI information are sent on the at least one AICH, and the auxiliary indication information is a serial number of the AICH that carries the EAI information.

12. The base station according to claim 9, wherein the processor is further configured to:
when a resource index range of the target resource is from A to B (including A and B), wherein $A=(X+31\times K+1) \bmod M$, and $B=(X+31\times K+31) \bmod M$, determine that the auxiliary indication information is K, wherein K is an integer greater than or equal to 0, and X is a resource index of a default resource corresponding to the random access preamble.

13. A resource indication method, comprising:
sending a random access preamble to a base station on a physical random access channel (PRACH), wherein the PRACH corresponds to at least one acquisition indicator channel (AICH);
detecting auxiliary indication information and detecting, on the at least one AICH, feedback information sent by the base station, wherein the feedback information comprises acquisition indicator (AI) information and extended acquisition indicator (EAI) information; and
determining, according to the feedback information and the auxiliary indication information, a resource index of a target resource allocated by the base station in M uplink transmission resources, wherein M is an integer greater than 32,
wherein the determining, according to the feedback information and the auxiliary indication information, the resource index of the target resource allocated by the base station in the M uplink transmission resources comprises:
when the AI information is an acknowledgement (ACK), determining a resource index of a default resource as the resource index of the target resource; or when the AI information is a negative acknowledgement (NACK), determining, according to the auxiliary indication information, a resource index range indicated by the EAI information and determining a resource index corresponding to a value of the EAI information as the resource index of the target resource.

14. The method according to claim 13, wherein before the sending the random access preamble on the physical random access channel (PRACH), further comprising:
receiving a random access parameter, and wherein the random access parameter comprises:
serial numbers of at least two AICHs corresponding to the PRACH; or
a serial number of an AICH corresponding to the PRACH and detection indication information, wherein the detection indication information is used to instruct to detect the auxiliary indication information; or
a serial number of an AICH corresponding to the PRACH and at least one time interval, wherein each time interval in the at least one time interval is a time period between time when the random access preamble is sent and time when the feedback information is detected.

15. A resource indication method, comprising:
receiving, on a physical random access channel (PRACH), a random access preamble sent by user equipment (UE), wherein the PRACH corresponds to at least one acquisition indicator channel (AICH);
determining a resource index of a target resource allocated to the UE in M uplink transmission resources, wherein M is an integer greater than 32;
determining feedback information and auxiliary indication information according to the resource index of the target resource, wherein the feedback information comprises acquisition indicator (AI) information and extended acquisition indicator (EAI) information; and
sending the feedback information on the at least one AICH,
wherein the determining feedback information according to the resource index of the target resource comprises:
when the resource index of the target resource is a resource index of a default resource, determining that the AI information is an acknowledgement (ACK); or
when the resource index of the target resource is a resource index of a non-default resource, determining that the AI information is a NACK.

16. The method according to claim 15, further comprising:
determining a random access parameter obtained by the UE from a network side, wherein the random access parameter comprises:
serial numbers of at least two AICHs corresponding to the PRACH; or
a serial number of an AICH corresponding to the PRACH and detection indication information, wherein the detection indication information is used to instruct to detect the auxiliary indication information; or
a serial number of an AICH corresponding to the PRACH and at least one time interval, wherein each time interval in the at least one time interval is a time period between time when the random access preamble is sent and time when the feedback information is detected.

* * * * *